(12) United States Patent
Yadav et al.

(10) Patent No.: US 12,483,544 B2
(45) Date of Patent: Nov. 25, 2025

(54) METHOD AND SYSTEM FOR PERFORMING AUTHENTICATION AND OBJECT DISCOVERY FOR ON-PREMISES CLOUD SERVICE PROVIDERS

(71) Applicant: Dell Products L.P., Round Rock, TX (US)

(72) Inventors: Sunil Yadav, Bangalore (IN); Amarendra Behera, Bangalore (IN); Tushar Dethe, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 425 days.

(21) Appl. No.: 17/972,367

(22) Filed: Oct. 24, 2022

(65) Prior Publication Data

US 2024/0137360 A1 Apr. 25, 2024
US 2024/0236077 A9 Jul. 11, 2024

(51) Int. Cl.
*H04L 29/06* (2006.01)
*H04L 9/40* (2022.01)

(52) U.S. Cl.
CPC ........ *H04L 63/083* (2013.01); *H04L 63/0428* (2013.01); *H04L 63/102* (2013.01)

(58) Field of Classification Search
CPC . H04L 63/083; H04L 63/0428; H04L 63/102; H04L 63/0281; H04L 68/08; H04L 67/56; H04L 63/0884; H04L 63/10; H04L 63/1097
See application file for complete search history.

(56) References Cited

U.S. PATENT DOCUMENTS

| 9,483,354 | B1 | 11/2016 | Gharpure |
| 10,686,792 | B1 * | 6/2020 | Keefer ................... H04L 67/53 |
| 10,929,423 | B1 | 2/2021 | Patwardhan |

(Continued)

OTHER PUBLICATIONS

"Authorize requests to Azure Storage (REST API)". Microsoft Learn. webpage <https://learn.microsoft.com/en-us/rest/api/storageservices/authorize-requests-to-azure-storage>, 3 pages, Jul. 13, 2021, retrieved from Internet Archive Wayback Machine <https://web.archive.org/web/20240000000000*/https://learn.microsoft.com/en-us/rest/api/storageservices/authorize-requests-to-azure-storage> on Feb. 7, 2024.

(Continued)

*Primary Examiner* — Yogesh Paliwal
(74) *Attorney, Agent, or Firm* — Chamberlain, Hrdlicka, White, Williams & Aughtry; Aly Z. Dossa

(57) ABSTRACT

Techniques described herein relate to a method for performing data protection services for limited access cloud data. The method includes obtaining, by a data manager, an initial cloud service provider (CSP) proxy generation request from a user; in response to obtaining the initial (CSP) proxy generation request: creating an authentication account in a CSP directory based on the initial CSP proxy generation request; instantiating a CSP proxy in an on-premises CSP using authentication information associated with the authentication account; storing the authentication information; and associating the user with the authentication information and the CSP proxy, wherein after the associating the CSP proxy can access limited access cloud data and cloud resources of the on-premises CSP.

20 Claims, 9 Drawing Sheets

(56) References Cited

U.S. PATENT DOCUMENTS

| | | | |
|---|---|---|---|
| 11,593,223 | B1 | 2/2023 | Mehta et al. |
| 2009/0265396 | A1 | 10/2009 | Ram |
| 2013/0305338 | A1* | 11/2013 | Casals Andreu ... H04L 63/0815 726/8 |
| 2015/0100547 | A1 | 4/2015 | Holmes-higgin et al. |
| 2016/0110377 | A1 | 4/2016 | Yun |
| 2016/0154818 | A1 | 6/2016 | Huang |
| 2018/0041598 | A1* | 2/2018 | Vats ..................... H04L 63/104 |
| 2019/0179711 | A1 | 6/2019 | Luo |
| 2020/0034248 | A1 | 1/2020 | Nara et al. |
| 2020/0034252 | A1 | 1/2020 | Mitkar et al. |
| 2020/0159413 | A1 | 5/2020 | Seal et al. |
| 2020/0394107 | A1 | 12/2020 | Ramohalli Gopala Rao |
| 2021/0084031 | A1* | 3/2021 | Lao ..................... H04L 63/0838 |
| 2021/0160231 | A1* | 5/2021 | Kumar ................ H04L 63/0815 |
| 2021/0191629 | A1 | 6/2021 | Vibhor |
| 2021/0286885 | A1 | 9/2021 | Locher |
| 2022/0200965 | A1 | 6/2022 | Polimera |
| 2022/0200998 | A1* | 6/2022 | Sudhakaran ............ H04L 63/20 |
| 2022/0210141 | A1* | 6/2022 | Parekh .................... H04L 63/08 |
| 2022/0271933 | A1 | 8/2022 | Chen et al. |

OTHER PUBLICATIONS

"Authorize with Azure Active Directory (REST API)". Azure Storage | Microsoft Learn. webpage <https://learn.microsoft.com/en-us/rest/api/storageservices/authorize-with-azure-active-directory>, 12 pages, Apr. 12, 2022, retrieved from Internet Archive Wayback Machine <https://web.archive.org/web/20240000000000*/https://learn.microsoft.com/en-us/rest/api/storageservices/authorize-with-azure-active-directory> on Feb. 7, 2024.

"Authorize with Shared Key (REST API)—Azure Storage". Microsoft Learn. webpage <https://learn.microsoft.com/en-us/rest/api/storageservices/authorize-with-shared-key>, 7 pages, Nov. 19, 2019, retrieved from Internet Archive Wayback Machine <https://web.archive.org/web/20240000000000*/https://learn.microsoft.com/en-us/rest/api/storageservices/authorize-with-shared-key> on Feb. 7, 2024.

"az ad sp". Microsoft Learn. webpage <https://learn.microsoft.com/en-us/cli/azure/ad/sp?view=azure-cli-latest>, 13 pages, Nov. 29, 2022, retrieved from Internet Archive Wayback Machine <https://web.archive.org/web/20240000000000*/https://learn.microsoft.com/en-us/cli/azure/ad/sp?view=azure-cli-latest> on Feb. 7, 2024.

"az keyvault secret". Microsoft Learn. webpage <https://learn.microsoft.com/en-us/cli/azure/keyvault/secret?view=azure-cli-latest#az-keyvault-secret-show>, 15 pages, Oct. 25, 2022, retrieved from Internet Archive Wayback Machine <https://web.archive.org/web/20240000000000*/https://learn.microsoft.com/en-us/cli/azure/keyvault/secret?view=azure-cli-latest#az-keyvault-secret-show> on Feb. 7, 2024.

"Difference between Managed and Unmanaged Disk—Stack Overflow", azure. webpage <https://stackoverflow.com/questions/46606870/difference-between-managed-and-unmanaged-disk>, 4 pages, Mar. 7, 2022, retrieved from Internet Archive Wayback Machine <https://web.archive.org/web/20240000000000*/https://stackoverflow.com/questions/46606870/difference-between-managed-and-unmanaged-disk> on Feb. 7, 2024.

"Azure Blob Storage enhancing data protection and recovery capabilities". Storage, Backup & Recovery. webpage <https://azure.microsoft.com/en-us/blog/azure-blob-storage-enhancing-data-protection-and-recovery-capabilities/>, 3 pages, May 11, 2020, retrieved from Internet Archive Wwayback Machine <https://web.archive.org/web/20240000000000*/https://azure.microsoft.com/en-us/blog/azure-blob-storage-enhancing-data-protection-and-recovery-capabilities/> on Feb. 7, 2024.

"Azure Managed Disks vs Unmanaged Disks". Difference Between Managed Disks and Unmanaged Disks, webapge <https://www.communicationsquare.com/news/azure-managed-disks-vs-unmanaged-disks/#:~:text=Difference%20Between%20Managed%20Disks%20and%20Unmanaged%20Disks,-Microsoft%20has%20launched&text=In%20unmanaged%20disks%2C%20you%20have,storage%20account%20per%20Azure%20region>, 24 pages, Jan. 23, 2021, retrieved from Internet Archive Wayback Machine <https://web.archive.org/web/20240000000000*/https://.

"Virtual Machines—Instance View" REST API (Azure Compute) | Microsoft Learn. <https://learn.microsoft.com/en-us/rest/api/compute/virtual-machines/instance-view?tabs=HTTP>. 10 pages. available in 2022, as a publication, retrieved on Apr. 25, 2023.

"Backup for Azure Blob Storage". samcogan.com. webpage <https://samcogan.com/backup-for-azure-blob-storage/>, 4 pages, Apr. 28, 2018, retrieved from Internet Archive Wayback Machine <https://web.archive.org/web/20240000000000*/https://samcogan.com/backup-for-azure-blob-storage/> on Feb. 7, 2024.

"Blob Containers—Create", REST API (Azure Storage Resource Provider), Microsoft Learn. <https://learn.microsoft.com/en-us/rest/api/storagerp/blob-containers/create?tabs=HTTP>, 7 pages, Sep. 1, 2022, retrieved on Apr. 25, 2023.

"Blob Containers—Get", REST APIi (Azure Storage Resource Provider) | Microsoft Learn. Sep. 1, 2022, <https://docs.microsoft.com/en-us/rest/api/storagerp/blobcontainers/get>, Retrieved on Apr. 25, 2023. 7 pages.

"Configure anonymous public read access for containers and blobs", Azure Storage | Microsoft Learn. webpage <https://docs.microsoft.com/en-us/azure/storage/blobs/anonymous-read-access-configure?tabs=portal>. 7 pages, Apr. 29, 2021, retrieved from Internet Archive Wayback Machine <https://web.archive.org/web/20210512222438/https://docs.microsoft.com/en-us/azure/storage/blobs/anonymous-read-access-configure?tabs=portal> on Feb. 7, 2024.

"Copy Blob", (REST API)—Azure Storage | Microsoft Learn. webpage <https://learn.microsoft.com/en-us/rest/api/storageservices/copy-blob?tabs=azure-ad>. 6 pages, Oct. 18, 2022, retrieved from Internet Archive Wayback Machine <https://web.archive.org/learn.microsoft.com/en-us/rest/api/storageservices/copy-blob> on Feb. 13, 2024.

"Create a service SAS", Azure Storage | Microsoft Learn. webapge <https://learn.microsoft.com/en-us/rest/api/storageservices/create-service-sas>, 26 pages, Aug. 9, 2022, retrieved from Internet Archived Wayback Machined <https://web.archive.org/web/20220923010756/https://learn.microsoft.com/en-us/rest/api/storageservices/create-service-sas> Feb. 7, 2024.

"Create a user delegation SAS", Azure Storage | Microsoft Learn. webpage <https://learn.microsoft.com/en-us/rest/api/storageservices/create-user-delegation-sas>, 22 pages, Aug. 9, 2022, retrieved from Internet Archive Wayback Machine <https://web.archive.org/web/20220923010756/https://learn.microsoft.com/en-us/rest/api/storageservices/create-user-delegation-sas> on Feb. 7, 2024.

"Create a workspace in Power BI", Power BI | Microsoft Learn. webpage <https://learn.microsoft.com/en-us/power-bi/collaborate-share/service-create-the-new-workspaces>, 10 pages, Aug. 31, 2022, retrieved from Internet Archive Wayback Machine <https://web.archive.org/web/20220919111647/https://learn.microsoft.com/en-us/power-bi/collaborate-share/service-create-the-new-workspaces> on Feb. 7, 2024.

"Create an account SAS", Azure Storage | Microsoft Learn. webpage <https://learn.microsoft.com/en-us/rest/api/storageservices/create-account-sas>, 15 pages, Aug. 9, 2022, retrieved from Internet Archive Wayback Machine <https://web.archive.org/web/20220928013416/https://learn.microsoft.com/en-us/rest/api/storageservices/create-account-sas> on Feb. 7, 2024.

"Create an Azure service principal with the Azure CLI", Azure CLI | Microsoft Learn. webpage <https://docs.microsoft.com/en-us/cli/azure/create-an-azure-service-principal-azure-cli?toc=%2Fazure%2Fazure-resource-manager%2Ftoc.json&view=azure-cli-latest>, 6 pages, Feb. 14, 2019, retrieved from Internet Archive Wayback Machine <https://web.archive.org/web/20190501020030/https://docs.microsoft.com/en-us/cli/azure/create-an-azure-service-principal-azure-cli?toc=%2Fazure%2Fazure-resource-manager%2Ftoc.json&view=azure-cli-latest> on Feb. 7, 2024.

"Create Container", Create Container (REST API)—Azure Storage | Microsoft Learn. webpage <https://learn.microsoft.com/en-us/rest/api/storageservices/create-container?tabs=azure-ad>. 3 pages. May 31, 2022, retrieved from Internet Archive Wayback Machine <https://

(56) References Cited

OTHER PUBLICATIONS web.archive.org/learn.microsoft.com/en-us/rest/api/storageservices/create-container> on Feb. 13, 2024.

"Disks—Create Or Update", Microsoft Learn. Dec. 1, 2021, <https://learn.microsoft.com/en-us/rest/api/compute/disks/create-or-update?tabs=HTTP>, Retrieved Apr. 25, 2023. 22 pages.

Embed content in your Power BI embedded analytics application for your organization—Power BI | Microsoft Learn. Tutorial: Embed Power BI content using a sample embed for your organization application. webpage <https://learn.microsoft.com/en-us/power-bi/developer/embedded/embed-sample-for-your-organization?tabs=net-core>, 11 pages, May 25, 2022, retrieved from Internet Archive Wayback Machine <https://web.archive.org/web/20230209040440/https://learn.microsoft.com/en-us/power-bi/developer/embedded/embed-sample-for-your-organization?tabs=net-core>.

"Embed Power BI content with service principal and an application secret", Microsoft Learn. webpage <https://docs.microsoft.com/en-us/power-bi/developer/embedded/embed-service-principal#considerations-and-limitations>, 10 pages, Mar. 30, 2020, retrieved from Internet Archive Wayback Machine <https://web.archive.org/web/20200515115554/https://docs.microsoft.com/en-us/power-bi/developer/embedded/embed-service-principal#considerations-and-limitations> on Feb. 7, 2024.

"Get Blob", Azure Storage | Microsoft Learn. webpage <https://learn.microsoft.com/en-us/rest/api/storageservices/get-blob?tabs=azure-ad>. 5 pages, Aug. 9, 2022, retrieved from Internet Archive Wayback Machine <https://web.archive.org/learn.microsoft.com/en-us/rest/api/storageservices/get-blob> on Feb. 13, 2024.

"Get Blob Properties", Microsoft Learn. <https://learn.microsoft.com/en-us/rest/api/storageservices/get-blob-properties?tabs=azure-ad>, 7 pages. available in 2022, as a publication, retrieved on Apr. 25, 2023.

"Get Container ACL", Microsoft Learn. webpage <https://learn.microsoft.com/en-us/rest/api/storageservices/get-container-acl>, 6 pages, Jul. 7, 2020, retrieved from Internet Archive Wayback Machine <https://web.archive.org/web/20221126210206/https://learn.microsoft.com/en-us/rest/api/storageservices/get-container-acl>, on Feb. 7, 2024.

"Get Container Metadata", Microsoft Learn. <https://learn.microsoft.com/en-us/rest/api/storageservices/get-container-metadata?tabs=azure-ad>, 3 pages. available in 2022, as a publication, retrieved on Apr. 25, 2023.

"Get Container Properties", Microsoft Learn. webpage <https://learn.microsoft.com/en-us/rest/api/storageservices/get-container-properties?tabs=azure-ad>, 2 pages. Jul. 7, 2020, retrieved from Internet Archive Wayback Machine <https://web.archive.org/learn.microsoft.com/en-us/rest/api/storageservices/get-container-properties> on Feb. 13, 2024.

Bertram, Adam. "How To Create And Authenticate To Azure With A Service Principal Using PowerShell." YouTube, TechSnips by ATA Learning, Oct. 18, 2018, <https://www.bing.com/videos/search?q=service+principal&docid=608034771019302350&mid=BD811A4B6BAA6157556FBD811A4B6BAA6157556F&view=detail&FORM=VIRE>. Retrieved on Feb. 6, 2024. 1 page.

"Introduction to Blob (object) Storage" Azure Storage | Microsoft Learn. webpage <https://learn.microsoft.com/en-us/azure/storage/blobs/storage-blobs-introduction>. 3 pages, Aug. 19, 2022, retrieved from Internet Archive Wayback Machine <https://web.archive.org/web/20220929045515/https://learn.microsoft.com/en-us/azure/storage/blobs/storage-blobs-introduction> on Feb. 7, 2024.

"Introduction to dataflows and self-service data prep" Power BI | Microsoft Learn. webpage <https://learn.microsoft.com/en-us/power-bi/transform-model/dataflows/dataflows-introduction-self-service>. 3 pages, Apr. 21, 2022, retrieved from Internet Archive Wayback Machine <https://web.archive.org/web/20220925185935/https://learn.microsoft.com/en-us/power-bi/transform-model/dataflows/dataflows-introduction-self-service> on Feb. 7, 2024.

"List Blobs (REST API)" Azure Storage | Microsoft Learn. webpage <https://learn.microsoft.com/en-us/rest/api/storageservices/list-blobs?tabs=microsoft-entra-id>. 7 pages. Apr. 12, 2022, retrieved from Internet Archive Wayback Machine <https://web.archive.org/learn.microsoft.com/en-us/rest/api/storageservices/list-blobs> on Feb. 13, 2024.

"List Containers (REST API)" Azure Storage | Microsoft Learn. webpage <https://learn.microsoft.com/en-us/rest/api/storageservices/list-containers2?tabs=microsoft-entra-id>. 4 pages. Mar. 28, 2022, retrieved from Internet Archive Wayback Machine <https://web.archive.org/learn.microsoft.com/en-us/rest/api/storageservices/list-containers2> on Feb. 13, 2024.

"Listing Blob storage resources" Azure Storage | Microsoft Learn. webpage <http://learn.microsoft.com/en-us/rest/api/storageservices/enumerating-blob-resources>. 6 pages, Jan. 26, 2021, retrieved from Internet Archive Wayback Machine <https://web.archive.org/web/20220923010637/https://learn.microsoft.com/en-us/rest/api/storageservices/enumerating-blob-resources> on Feb. 7, 2024.

Michael Buckbee, "Active Directory Resource Center", Varonis. <https://www.varonis.com/blog/what-is-active-directory>. Feb. 10, 2022. 21 pages. Retrieved on Apr. 28, 2023.

"Virtual Machines—Create Or Update" REST API (Azure Compute) | Microsoft Learn. webpage <https://learn.microsoft.com/en-us/rest/api/compute/virtual-machines/create-or-update?tabs=HTTP>. 86 pages. retrieved from Internet Archive Wayback Machine <https://web.archive.org/web/20221103162710/https://learn.microsoft.com/en-us/rest/api/compute/virtual-machines/create-or-update?tabs=HTTP> on Feb. 8, 2024.

"Network Interfaces—Create Or Update" REST API (Azure Virtual Networks) | Microsoft Learn. <https://learn.microsoft.com/en-us/rest/api/virtualnetwork/network-interfaces/create-or-update?tabs=HTTP>. Sep. 1, 2022. 29 pages. Retrieved on Apr. 25, 2023.

"Network Interfaces—Get" REST API (Azure Virtual Networks) | Microsoft Learn. <https://learn.microsoft.com/en-us/rest/api/virtualnetwork/network-interfaces/get?tabs=HTTP#examples>. Sep. 1, 2022. 27 pages. Retrieved on Apr. 25, 2023.

"Network Interfaces—List" REST API (Azure Virtual Networks) | Microsoft Learn. <https://learn.microsoft.com/en-us/rest/api/virtualnetwork/network-interfaces/list?tabs=HTTP>. 27 pages. Sep. 1, 2022. Retrieved on Apr. 25, 2023.

"Network Security Groups—List" REST API (Azure Virtual Networks) | Microsoft Learn. <https://learn.microsoft.com/en-us/rest/api/virtualnetwork/network-security-groups/list?tabs=HTTP>. Sep. 1, 2022. 28 pages. Retrieved on Apr. 25, 2023.

"Overview of identity providers for Azure Stack Hub" Azure Stack Hub | Microsoft Learn. webpage <https://learn.microsoft.com/en-us/azure-stack/operator/azure-stack-identity-overview?view=azs-2008>. 11 pages. Jul. 29, 2022. retrieved from Internet Archive Wayback Machine <https://web.archive.org/web/20221006210803/https://learn.microsoft.com/en-us/azure-stack/operator/azure-stack-identity-overview?view=azs-2008> on Feb. 7, 2024.

"Public IP Addresses—Create Or Update" REST API (Azure Virtual Networks) | Microsoft Learn. <https://learn.microsoft.com/en-us/rest/api/virtualnetwork/public-ip-addresses/create-or-update?tabs=HTTP>. 29 pages, Sep. 1, 2022. Retrieved on Apr. 25, 2023.

"Put Blob (REST API)" Azure Storage | Microsoft Learn. webpage <https://learn.microsoft.com/en-us/rest/api/storageservices/put-blob?tabs=azure-ad>. 4 pages. Jul. 20, 2021, retrieved from Internet Archive Wayback Machine <https://web.archive.org/learn.microsoft.com/en-Uus/rest/api/storageservices/put-blob> on Feb. 13, 2024.

"Resource Groups—Check Existence" REST API (Azure Resource Management) | Microsoft Learn. <https://learn.microsoft.com/en-us/rest/api/resources/resource-groups/check-existence>. 2 pages. Apr. 1, 2021. Retrieved on Apr. 25, 2023.

"What is the difference between managed disk and unmanaged disk?" Microsoft Q&A. Dec. 17, 2019. <https://learn.microsoft.com/en-us/answers/questions/3619/what-is-the-difference-between-managed-disk-and-un>. 2 pages Retrieved on Apr. 25, 2023.

"Resource Groups—Create Or Update" REST API (Azure Resource Management) | Microsoft Learn. <https://learn.microsoft.com/en-us/rest/api/resources/resource-groups/create-or-update?tabs=HTTP>. 3 pages. Apr. 1, 2021. Retrieved on Apr. 25, 2023.

"Virtual Networks—List" REST API (Azure Virtual Networks) | Microsoft Learn. Sep. 1, 2022. <https://learn.microsoft.com/en-us/rest/api/virtualnetwork/virtual-networks/list?tabs=HTTP>. 29 pages. Retrieved on Apr. 25, 2023.

(56) References Cited

OTHER PUBLICATIONS

"Subnets—Create Or Update" REST API (Azure Virtual Networks) | Microsoft Learn. Sep. 1, 2022. <https://learn.microsoft.com/en-us/rest/api/virtualnetworks/subnets/create-or-update?tabs=HTTP>. 29 pages. Retrieved Apr. 25, 2023.

"Service SAS examples" Azure Storage | Microsoft Learn. webpage <https://learn.microsoft.com/en-us/rest/api/storageservices/service-sas-examples>. 18 pages, Sep. 24, 2019. retrieved from Internet Archived Wayback Machine <https://web.archive.org/web/20220928081451/https://learn.microsoft.com/en-us/rest/api/storageservices/service-sas-examples> on Feb. 7, 2024.

"Set Container ACL" Azure Storage | Microsoft Learn. webpage <https://learn.microsoft.com/en-us/rest/api/storageservices/set-container-acl>. 8 pages. Jul. 7, 2020. retrieved from Internet Archive Wayback Machine <https://web.archive.org/web/20220929155045/https://learn.microsoft.com/en-us/rest/api/storageservices/set-container-acl> on Feb. 7, 2024.

"Snapshot Blob" Azure Storage | Microsoft Learn. <https://learn.microsoft.com/en-us/rest/api/storageservices/snapshot-blob?tabs=microsoft-entra-id>. 5 pages. available in 2022, as a publication, retrieved on Apr. 25, 2023.

"Snapshots—Create Or Update" Rest API (Azure Compute) | Microsoft Learn. Dec. 1, 2021. <https://learn.microsoft.com/en-us/rest/api/compute/snapshots/create-or-update?tabs=HTTP>. 15 pages. Retrieved on Apr. 25, 2023.

"Snapshots—Delete" REST API (Azure Compute) | Microsoft Learn. Dec. 1, 2021. <https://learn.microsoft.com/en-us/rest/api/compute/snapshots/delete?tabs=HTTP>. 2 pages. Retrieved on Apr. 25, 2023.

"Snapshots—Grant Access" REST API (Azure Compute) | Microsoft Learn. Dec. 1, 2021. <https://learn.microsoft.com/en-us/rest/api/compute/snapshots/grant-access?tabs=HTTP>. 3 pages. Retrieved on Apr. 25, 2023.

"Snapshots—List" REST API (Azure Compute) | Microsoft Learn. Dec. 1, 2021. <https://learn.microsoft.com/en-us/rest/api/compute/snapshots/list?tabs=HTTP>. 12 pages. Retrieved on Apr. 25, 2023.

"Snapshots—Revoke Access" REST API (Azure Compute) | Microsoft Learn. Dec. 1, 2021. <https://learn.microsoft.com/en-us/rest/api/compute/snapshots/revoke-access?tabs=HTTP>. 2 pages. Retrieved on Apr. 25, 2023.

"Storage Accounts—Check Name Availability" REST API (Azure Storage Resource Provider) | Microsoft Learn. Sep. 1, 2022. <https://learn.microsoft.com/en-us/rest/api/storagerp/storage-accounts/check-name-availability?tabs=HTTP>. 2 pages. Retrieved on Apr. 25, 2023.

"Storage Accounts—Create" REST API (Azure Storage Resource Provider) | Microsoft Learn. Sep. 1, 2022. <https://learn.microsoft.com/en-us/rest/api/storagerp/storage-accounts/create?tabs=HTTP>. 37 pages. Retrieved on Apr. 25, 2023.

"Virtual Networks—Create Or Update" REST API (Azure Virtual Networks) | Microsoft Learn. Sep. 1, 2022. <https://learn.microsoft.com/en-us/rest/api/virtualnetwork/virtual-networks/create-or-update?tabs=HTTP>. 38 pages. Retrieved on Apr. 25, 2023.

"Storage Accounts—Get Properties" REST API (Azure Storage Resource Provider) | Microsoft Learn. Sep. 1, 2022. <https://learn.microsoft.com/en-us/rest/api/storagerp/storage-accounts/get-properties?tabs=HTTP#storageaccountgetproperties>. 21 pages. Retrieved on Apr. 25, 2023.

"Storage Accounts—List" REST API (Azure Storage Resource Provider) | Microsoft Learn. Sep. 1, 2022. <https://learn.microsoft.com/en-us/rest/api/storagerp/storage-accounts/list?tabs=HTTP>. 20 pages. Retrieved on Apr. 25, 2023.

"Storage Accounts—ist Account SAS" REST API (Azure Storage Resource Provider) | Microsoft Learn. Sep. 1, 2022. <https://learn.microsoft.com/en-us/rest/api/storagerp/storage-accounts/list-account-sas?tabs=HTTP>. 5 pages. Retrieved on Apr. 25, 2023.

"Storage Accounts—List Keys" REST API (Azure Storage Resource Provider) | Microsoft Learn. Sep. 1, 2022. <https://learn.microsoft.com/en-us/rest/api/storagerp/storage-accounts/list-keys?tabs=HTTP>. 3 pages. Retrieved on Apr. 25, 2023.

"Storage Accounts—List Service SAS" REST API (Azure Storage Resource Provider) | Microsoft Learn. Sep. 1, 2022. <https://learn.microsoft.com/en-us/rest/api/storagerp/storage-accounts/list-service-sas?tabs=HTTP>. 5 pages. Retrieved on Apr. 25, 2023.

Search Report under Section 17(5) mailed Mar. 11, 2024, issued in the corresponding United Kingdom Patent Application No. GB2313526.2 (3 pages).

* cited by examiner

METHOD AND SYSTEM FOR PERFORMING AUTHENTICATION AND OBJECT DISCOVERY FOR ON-PREMISES CLOUD SERVICE PROVIDERS

BACKGROUND

Computing devices may provide services for users. To provide the services, the computing devices may generate data. The computing devices may provide to and obtain data from other computing devices. The data may be important to the user. Backups of the data may be generated. Computing devices may be authenticated to access data to perform the backups. Computing devices may also discover the data to perform the backups.

SUMMARY

In general, certain embodiments described herein relate to a method for performing data protection services for limited access cloud data. The method may include obtaining, by a data manager, an initial cloud service provider (CSP) proxy generation request from a user; in response to obtaining the initial (CSP) proxy generation request: creating an authentication account in a CSP directory based on the initial CSP proxy generation request; instantiating a CSP proxy in an on-premises CSP using authentication information associated with the authentication account; storing the authentication information; and associating the user with the authentication information and the CSP proxy, wherein after the associating the CSP proxy can access limited access cloud data and cloud resources of the on-premises CSP.

In general, certain embodiments described herein relate to a system for performing data protection services for limited access cloud data. The system includes an on-premises cloud service provider (CSP). The system also includes a data manager, which includes a processor and memory, and is programmed to obtain an initial cloud service provider (CSP) proxy generation request from a user; in response to obtaining the initial (CSP) proxy generation request: create an authentication account in a CSP directory based on the initial CSP proxy generation request; instantiate a CSP proxy in the on-premises CSP using authentication information associated with the authentication account; store the authentication information; and associate the user with the authentication information and the CSP proxy, wherein after the associating the CSP proxy can access limited access cloud data and cloud resources of the on-premises CSP.

In general, certain embodiments described herein relate to a non-transitory computer readable medium that includes computer readable program code, which when executed by a computer processor enables the computer processor to perform a method for performing data protection services for limited access cloud data. The method may include obtaining, by a data manager, an initial cloud service provider (CSP) proxy generation request from a user; in response to obtaining the initial (CSP) proxy generation request: creating an authentication account in a CSP directory based on the initial CSP proxy generation request; instantiating a CSP proxy in an on-premises CSP using authentication information associated with the authentication account; storing the authentication information; and associating the user with the authentication information and the CSP proxy, wherein after the associating the CSP proxy can access limited access cloud data and cloud resources of the on-premises CSP.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
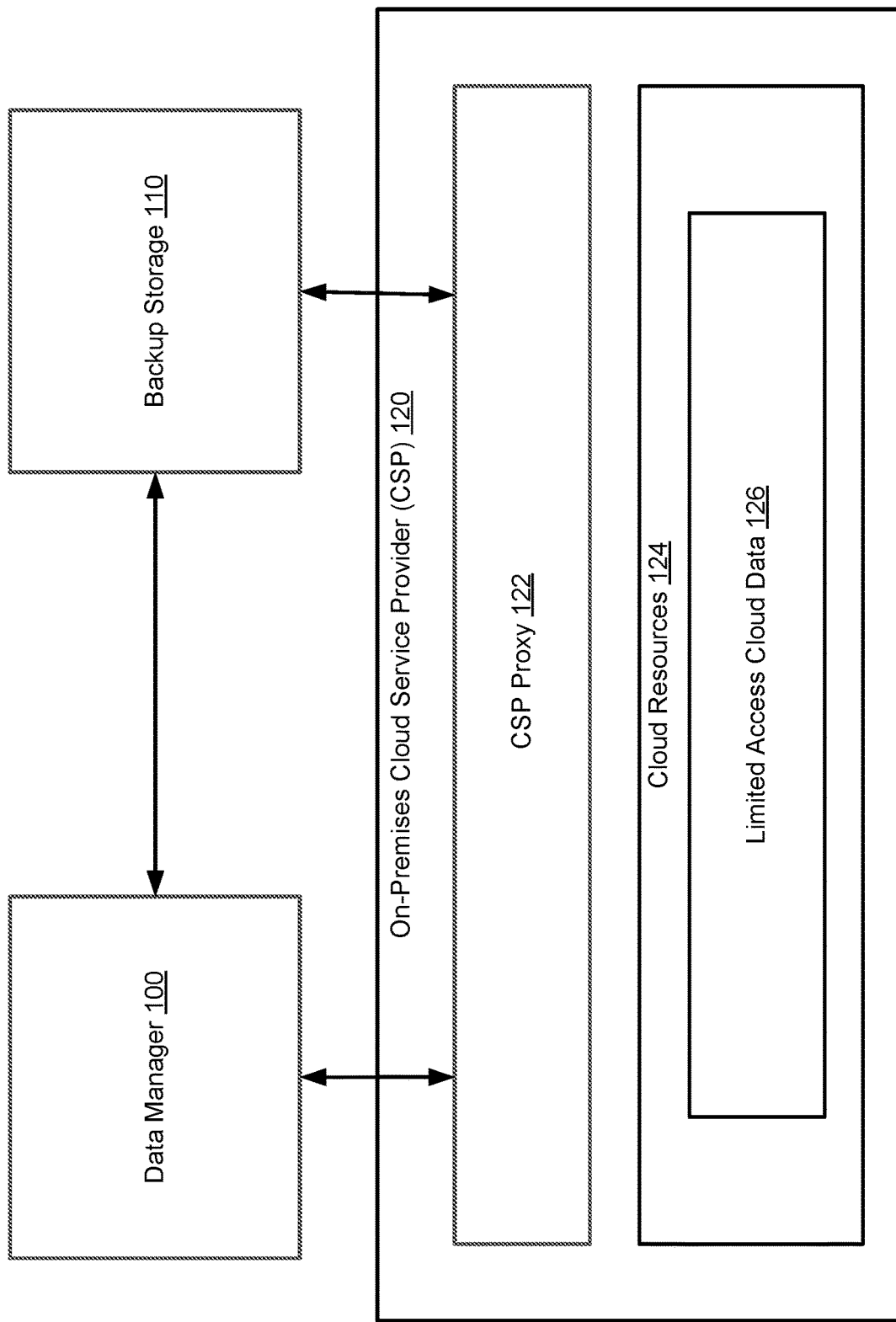
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as a and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general embodiments of the invention relate to methods, systems, and non-transitory computer readable mediums for performing authentication and discovery for limited access cloud data.

One or more embodiments of the invention relate to performing authentication and object discovery of an on-premises cloud service provider (CSP) to enable data protection services. As a result, a data manager may include the ability to access limited access user data and discover objects included in the limited access user data. Thus, the availability and data protection of limited access cloud data of the on-premises CSP may be improved.

FIG. 1A shows a diagram a system in accordance with one or more embodiments disclosed herein. The system may include a data manager (100), a backup storage (110) and an on-premises cloud service provider (CSP) (120). Users may execute workloads using the on-premises CSP (120). The execution of the workloads may result in the generation of limited access cloud data (discussed below). The user may desire to protect the limited access cloud data for restoration, availability, and/or disaster recovery purposes. The data manager (100) may perform data protection management services to protect limited access user data by generating backups of limited access user data and storing the backups in the backup storage (110). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the data manager (100) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2B. The data manager (100) may be implemented using other types of computing devices without departing from embodiments disclosed herein. For additional details regarding computing devices, refer to FIG. 6.

In one or more embodiments, the data manager (100) may be implemented using logical devices without departing from embodiments disclosed herein. For example, the data manager (100) may include virtual machines that utilize computing resources of any number of physical computing devices to provide the functionality of the data manager (100). The data manager (100) may be implemented using other types of logical devices without departing from the embodiments disclosed herein.

In one or more embodiments, the data manager (100) may include the functionality to, or may be otherwise programmed or configured to, perform data protection management services for the on-premises CSP (120). The data protection management services may include: (i) performing an on-premises CSP authentication operation, (ii) initiating discovery operations associated with the on-premises CSP (120), (iii) initiate full backups and incremental approximation backups of limited access cloud data on the on-premises CSP (120), and (iv) assigning protection policy types to subscriptions associated with the on-premises CSP. The data protection management services may further include initiating restoration services using indexing metadata associated with backup stored in the backup storage (110). The restoration services may include restoring limited access user data on the on-premises CSP (120) to a previous point in time using the backups stored in the backup storage (110).

The data protection management services may include other and/or additional services without departing from embodiments disclosed herein. The data manager (100) may include the functionality to perform all, or a portion of, the methods of FIGS. 2A-5. The data manager (100) may include other and/or additional functionalities without departing from embodiments disclosed herein. For additional information regarding the data manager (100), refer to FIG. 1B.

In one or more embodiments, the backup storage (110) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (110) described herein and/or all, or a portion, of the methods illustrated in FIGS. 3A-5. The backup storage (110) may be implemented using other types of computing devices without departing from the embodiments disclosed herein. For additional details regarding computing devices, refer to FIG. 6.

The backup storage (110) may be implemented using logical devices without departing from the embodiments disclosed herein. For example, the backup storage (110) may include virtual machines that utilize computing resources of any number of physical computing devices to provide the functionality of the backup storage (110). The backup storage (110) may be implemented using other types of logical devices without departing from the embodiments disclosed herein.

In one or more embodiments, the backup storage (110) may include the functionality to, or otherwise be programmed or configured to, obtain full backups and incremental approximation backups from the on-premises CSP (120) or the data manager (100), store the full backups and incremental approximation backups, maintain the full backups and the incremental approximation backups based on associated protection policies, and provide all, or a portion, of the full and incremental approximation backups to the on-premises CSP (120) for restoration purposes. The backup storage (110) may include the functionality to perform all, or a portion of, the methods discussed in FIGS. 3A-5. The backup storage (110) may include other and/or additional functionalities without departing from embodiments disclosed herein.

In one or more embodiments, the on-premises CSP (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (110) described herein and/or all, or a portion, of the methods illustrated in FIGS. 2A-5. The on-premises CSP (120) may be implemented using other types of computing devices without departing from the embodiments disclosed herein. For additional details regarding computing devices, refer to FIG. 6.

The on-premises CSP (120) may be implemented using logical devices without departing from the embodiments disclosed herein. For example, the on-premises CSP (120) may include virtual machines that utilize computing resources of any number of physical computing devices to provide the functionality of the on-premises CSP (120). The on-premises CSP (120) may be implemented using other types of logical devices without departing from the embodiments disclosed herein.

In one or more embodiments, the on-premises CSP (120) may execute or otherwise operate in a single physical location such as a single data center of a company or organization. This may be in contrast with traditional CSPs which include cloud resources distributed widely across large geographical areas. The on-premises CSP (120) may provide users with the traditional cloud resources and cloud services, but with the lower latency and improved security of an on-premises execution environment.

In one or more embodiments, the on-premises CSP (120) may include the functionality to, or otherwise be programmed or configured to, perform cloud services for users of the on-premises CSP (120). The cloud services may include application development services, application deployments services, database services, cloud computing services, cloud networking services, and/or cloud storage services. The cloud services may include other and/or additional types of services without departing from embodiments disclosed herein. The on-premises CSP (120) may include the functionality to perform all, or a portion of, the methods discussed in FIGS. 2A-5. The on-premises CSP (120) may include other and/or additional functionalities without departing from embodiments disclosed herein.

In one or more embodiments, to perform the aforementioned cloud services, the on-premises CSP (120) may include a CSP proxy (122) and cloud resources (124). The on-premises CSP (120) may include other, additional, or fewer components without departing from embodiments disclosed herein. Each of the aforementioned components of the on-premises CSP (120) is discussed below.

In one or more embodiments disclosed herein, the CSP proxy (122) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the CSP proxy (122) described throughout this Detailed Description.

In one or more embodiments disclosed herein, the CSP proxy (122) is implemented as computer instructions, e.g., computer code, stored on a storage that when executed by a processor of the on-premises CSP (120) causes the on-premises CSP (120) to provide the functionality of the CSP proxy (122) described throughout this Detailed Description.

In one or more embodiments, the CSP proxy (122) may include the functionality to perform data protection services initiated by the data manager (100) for the on-premises CSP (120). The data protection services may include: (i) discovering subscriptions and services associated with the on-premises CSP, (ii) discovery objects stored in the limited access cloud data (126) of the cloud resources (124) and generating an asset hierarchy using the discovered objects, (iii) generating full backups of objects include in the limited access cloud data (126), (iv) generating incremental approximation backups of objects stored in the limited access cloud data (126), and (v) generating indexing metadata associated with backups. The data protection services may include other and/or additional services without departing from embodiments disclosed herein. The CSP proxy (122) may include the functionality to perform all, or a portion, of the methods of FIGS. 2A-5. The CSP proxy (122) may include other and/or additional functionalities without departing from embodiments disclosed herein.

In one or more embodiments, cloud resources (124) may include any number of computing devices (not shown). In one or more embodiments, a computing device is any device, portion of a device, or any set of devices capable of electronically processing instructions to perform cloud services and may include any number of components, which include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create the cloud resources (124). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments of the invention may be implemented using computing devices.

In one or more embodiments, the performance of the cloud services by the cloud resources (124) may result in the generation of limited access cloud data (126). The limited access cloud data (126) may include one or more data structures that may be used to generate backups. The limited access cloud data (126) may include user data generated by users of the on-premises CSP (120) as discussed above. The limited access cloud data (126) may be database data, application data, workload data, and/or other types of data generated by users of the on-premises CSP (120) without departing from embodiments disclosed herein. Users may use the data of the limited access cloud data (126) when obtaining cloud services from the on-premises CSP (120). Additionally, the data of the limited access cloud data (126) may be obtained by the backup storage (110) for backup generation. The limited access cloud data (126) may be used by other and/or additional entities for other and/or additional purposes without departing from embodiments disclosed herein.

The limited access cloud data (126) may be stored in proprietary format that prevents other applications, users and/or other entities from reading and/or using the limited access cloud data (126). The limited access cloud data (126) may not be accessed or used by other users, applications, or other entities without authorization. The limited access cloud data (126) may be encrypted using encryption keys associated with the CSP proxy (122) and a specific user and/or subscription to secure the limited access cloud data (126). The limited access cloud data (126) may be secured using other security methods without departing from the invention.

In one or more embodiments, access to the limited access cloud data (126) may be gated by the CSP proxy (122) and/or other entities. In other words, the data included in the limited access cloud data (126) may not be accessed by other entities without utilizing the functionality of the CSP proxy or other entities that have access to or otherwise maintain the limited access cloud data (126).

In one or more embodiments, the cloud resources (124) that have access to the limited access cloud data (126) may not include functionality to perform data protection services (e.g., backup generation services, restoration services, etc.) restorations of the limited access cloud data repository using backups of the limited access cloud data repository. For example, the cloud resources (e.g., the API associated with the cloud resources) may only include functionality to (i) add data to the limited access cloud data (126), (ii) remove data from the limited access cloud data (126), (iii) obtain data and/or metadata regarding portions of the limited access cloud data (126) (e.g., objects, fields, or other types of discrete data constructs), and/or (iv) modify existing data and/or metadata.

Because the data manager (100) may not have access to the limited access cloud data (126), the data manager (100) may not be able to directly perform data protection services for the limited access cloud data (126). As a result, the data manager (100) may instantiate the CSP proxy (122) within the on-premises CSP (120), and manage the performance of data protection services by the CSP proxy (122) on the limited access cloud data (126).

Although the system of FIG. 1A is shown as having a certain number of components (e.g., 100, 110, 120, 122, 124, 126), in other embodiments disclosed herein, the system may have more or fewer components. For example, the functionality of each component described above may be split across components or combined into a single component. Further still, each component may be utilized multiple times to carry out an iterative operation.

Figure 1B:
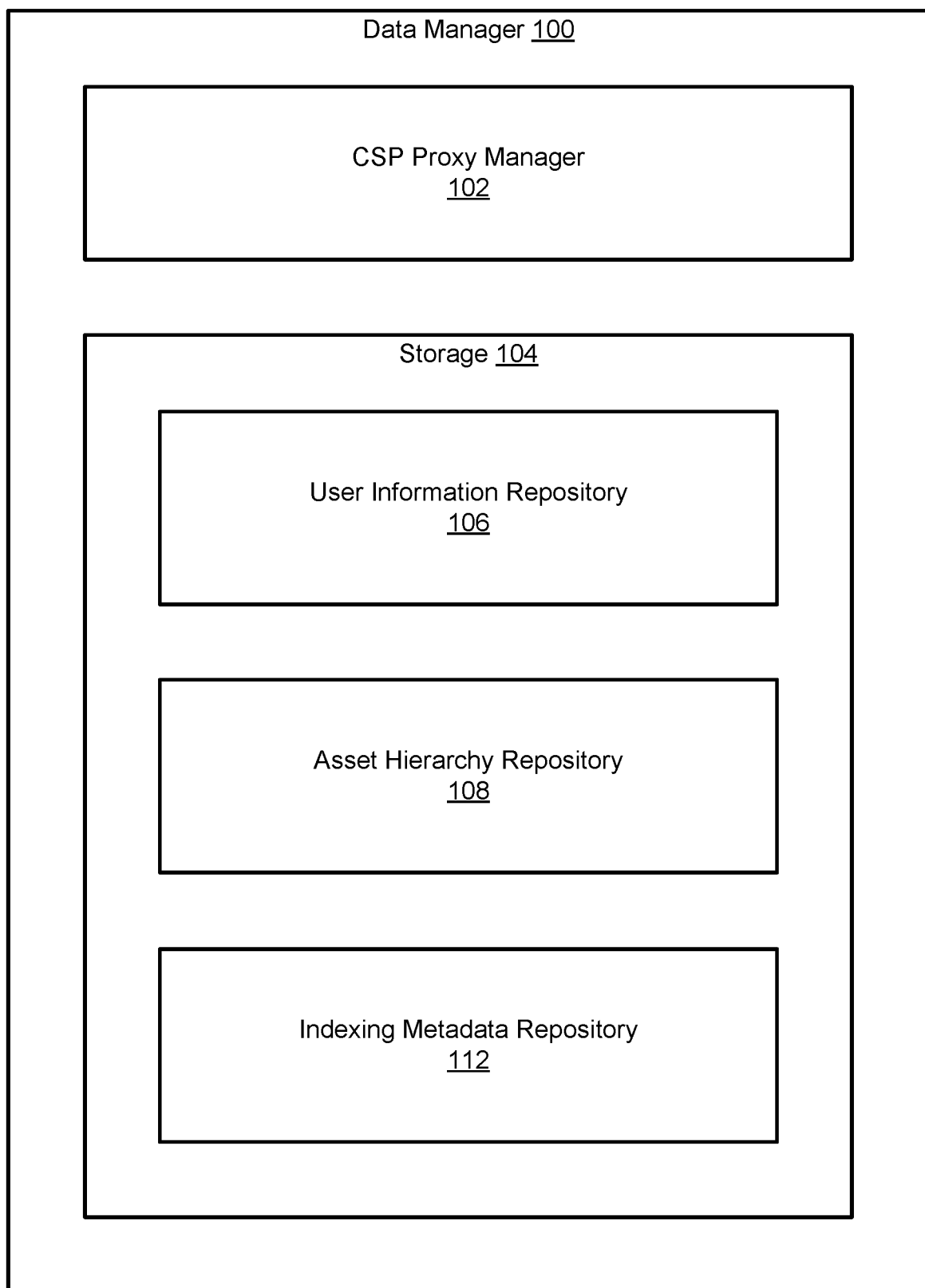
FIG. 1B shows a diagram of a data manager in accordance with one or more embodiments disclosed herein.

FIG. 1B shows a diagram of a data manager in accordance with one or more embodiments disclosed herein. The data manager (100) may be an embodiment of the data manager (100, FIG. 1A) discussed above. As discussed above, the data manager (100) may include the functionality to perform data protection management services. To perform the data protection management services, the data manager (100) may include a CSP Proxy manager (102) and storage (104). The data manager (100) may include other, additional, and/or fewer components without departing from embodiments disclosed herein. Each of the aforementioned components of the data manager (100) are discussed below.

In one or more embodiments disclosed herein, the CSP proxy manager (102) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the CSP proxy manager (102) described throughout this Detailed Description.

In one or more embodiments disclosed herein, the CSP proxy manager (102) is implemented as computer instructions, e.g., computer code, stored on a storage that when executed by a processor of the data manager (100) causes the data manager (100) to provide the functionality of the CSP proxy manager (102) described throughout this Detailed Description.

In one or more embodiments, the CSP proxy manager (102) may include the functionality to perform the aforementioned data protection management services of the data manager (100). To perform the data protection management services, the CSP proxy manager (102) may send requests (e.g., API calls) to the CSP proxy (122, FIG. 1A) to initiate the performance of data protection services by the CSP proxy (122, FIG. 1A). Additionally, the CSP proxy manager (102, FIG. 1A) may obtain data and information from the CSP proxy (122, FIG. 1A) that may be used to generate, update, modify, or otherwise maintain the data structures stored in the storage (104). The CSP proxy manager (102) may further include the functionality to provide and obtain data protection information (e.g., indexing metadata, protection policies, etc.) to/from users (e.g., through a user interface). The CSP proxy manager (102) may include other and/or additional functionalities without departing from embodiments disclosed herein.

In one or more embodiments, the storage (104) may be implemented using one or more volatile or non-volatile storages or any combination thereof. The storage (104) may include the functionality to, or otherwise be configured to, store and provide all, or portions, of information that may be used by the CSP proxy manager (102) and/or the CSP proxy (122, FIG. 1A). The information stored in the storage (104) may include a user information repository (106), an asset hierarchy repository (108), and an indexing metadata repository (112). The storage may include other and/or additional information without departing from embodiments disclosed herein. Each of the aforementioned data structures is discussed below.

In one or more embodiments, the user information repository (106) may refer to one or more data structures that include user information. The user information may include user identifiers, CSP proxy identifiers, subscription information (discussed below), authentication information (discussed below), and protection policy types assigned to subscriptions associated with each user of the on-premises CSP. In one or more embodiments, a subscription may include one or more cloud services that are performed by a portion of the cloud resources (124, FIG. 1A). Each subscription may be associated with a user. Each user may include multiple subscriptions. The data manager (100) may use the user information included in the user information repository (106) to perform data protection management services. The user information may be used for other and/or additional purposes without departing from embodiments disclosed herein. The user information repository (106) may include other and/or additional information without departing from embodiments disclosed herein.

In one or more embodiments, the asset hierarchy repository (108) may refer to one or more data structures that include asset hierarchies. In one or more embodiments, the asset hierarchies may be used to identify assets (e.g., objects) included in the limited access cloud data (126, FIG. 1A). For additional information regarding asset hierarchies, refer to FIG. 2B.

In one or more embodiments, the indexing metadata repository (112) may refer to one or more data structures that include indexing metadata associated with VMs of the cloud resources. For additional information regarding indexing data, refer to FIG. 4.

While the data structures (e.g., 104, 106, 108) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (104), any of the aforementioned data structures may be stored in different locations (e.g., in storage of other computing devices) and/or spanned across any number of computing devices without departing from embodiments disclosed herein. The data structures discussed in this Detailed Description may be implemented using, for example, lists, linked lists, tables, unstructured data, databases, etc.

Figure 2A:
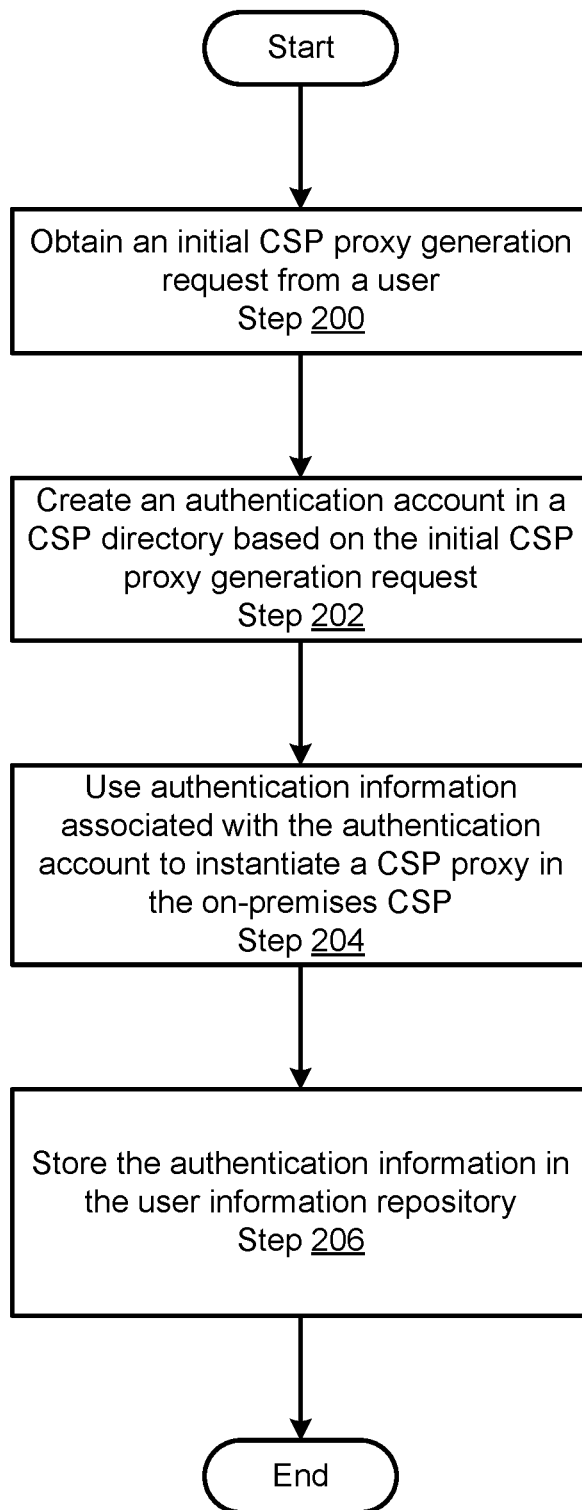
FIG. 2A shows a flowchart of a method for performing authentication for a cloud service provider in accordance with one or more embodiments disclosed herein.

FIG. 2A shows a flowchart of a method for performing authentication for a cloud service provider in accordance with one or more embodiments disclosed herein. The method shown in FIG. 2A may be performed by, for example, the data manager (e.g., 100, FIG. 1A). Other components of the system in FIGS. 1A-1B may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, an initial CSP proxy generation request is obtained from a user. In one or more embodiments, a user submits a request to instantiate a CSP proxy in the on-premises CSP. The request may include the user identifier. The request may include other and/or additional information associated with the user without departing from embodiments disclosed herein. The user may submit the request using any appropriate method without departing from embodiments disclosed herein. For example, the user may submit the request through a user interface (e.g., graphical user interface). The initial CSP proxy generate request may be obtained from the user via other and/or additional methods without departing from embodiments disclosed herein.

In Step 202, an authentication account may be created in a CSP directory based on the initial CSP proxy generation request. In one or more embodiments, the data manager generates an authentication account (e.g., a service principal) in a CSP directory of an authentication management entity (e.g., an application) of the on-premises CSP. The authentication account may include authentication information (e.g., permissions, passwords, encryption keys, certificates, etc.) that may be used to access cloud resources and limited access user data of the on-premises CSP. The authentication account may be created in a CSP directory based on the initial CSP proxy generation request via other and/or additional methods without departing from embodiments disclosed herein.

In Step 204, the authentication information associated with the authentication account is used to instantiate a CSP proxy in the on-premises CSP. In one or more embodiments, the data manager instantiates the CSP proxy using the authentication information of the authentication account to access cloud resources of the on-premises CSP. The data manager may instantiate the CSP proxy by providing computer instructions (e.g., a CSP proxy binary, a CSP proxy image, etc.) to the one or more cloud resources and initiate the execution of the computer instructions so that the CSP proxy is instantiated. The authentication information associated with the authentication account may be used to instantiate a CSP proxy in the on-premises CSP via other and/or additional methods without departing from embodiments disclosed herein.

In Step 206, the authentication information may be stored in the user information repository. In one or more embodiments, the data manager stores the authentication information in the user information repository. The data manager may associated the authentication information with the user (e.g., the user identifier) and the CSP proxy (e.g., the CSP proxy identifier). Other information may be associated with the authentication information. The authentication information may be used by the CSP proxy and other entities (e.g., users) to access cloud resources and limited access cloud data in the on-premises CSP to perform future data protection services. The data manager may include authentication information in data protection requests sent to the CSP proxy. The authentication information may be stored in the user information repository via other and/or additional methods without departing from embodiments disclosed herein.

In one or more embodiments, the method ends following Step 206.

Figure 2B:
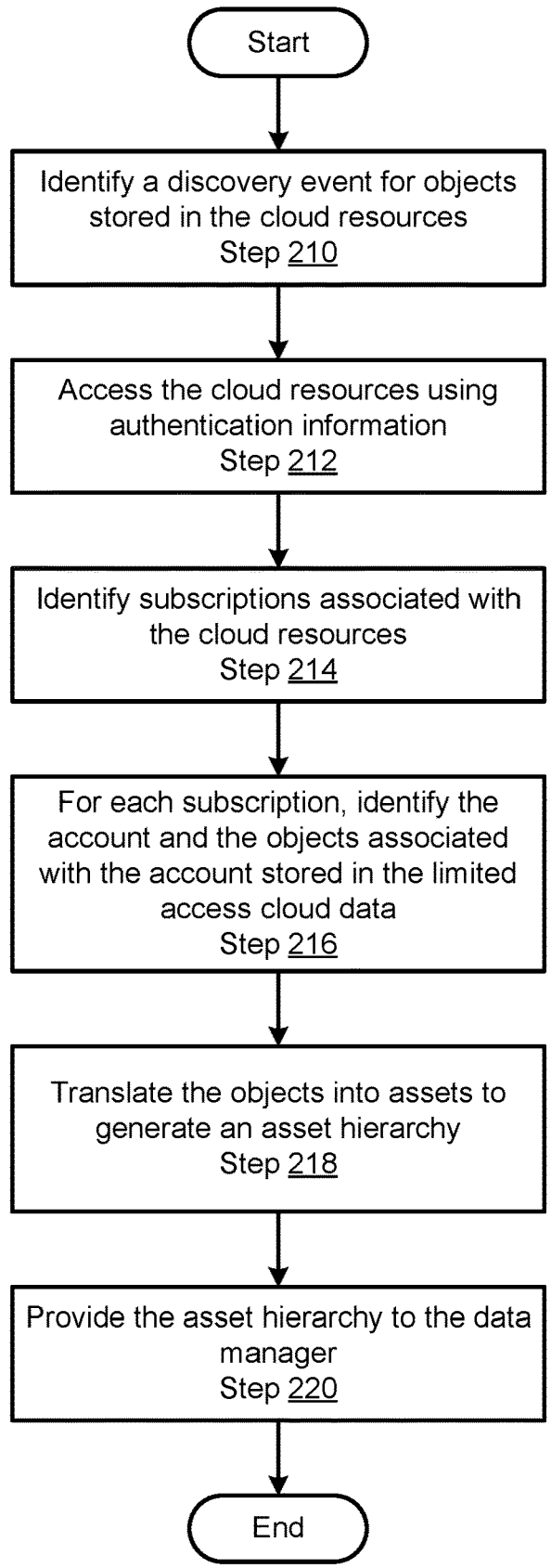
FIG. 2B shows a flowchart of a method for a discovery of assets in a cloud service provider in accordance with one or more embodiments disclosed herein.

FIG. 2B shows a flowchart of a method for a discovery of assets in a cloud service provider in accordance with one or more embodiments disclosed herein. The method shown in FIG. 2B may be performed by, for example, the CSP proxy (e.g., 122, FIG. 1A). Other components of the system in FIGS. 1A-1B may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 210, a discovery event for objects stored in the cloud resources is identified. In one or more embodiments, the data manager may submit a discovery request to the CSP proxy. The data manager may periodically submit discovery requests to the CSP proxy based on a discovery schedule that specifies points in time to perform discoveries of objects in the limited access cloud data. The CSP proxy may identify the receipt of the discovery request as the discovery event for objects stored in limited access cloud data of cloud resources. The discovery event for objects stored in the cloud resources may be identified via other and/or additional methods without departing from embodiments disclosed herein.

In Step 212, the cloud resources are accessed using authentication information. In one or more embodiments, the CSP proxy uses the authentication information (e.g., permissions, passwords, encryption keys, certificates, etc.) to access the cloud resources and the limited access cloud data. In one or more embodiments, the CSP proxy may include the authentication information in storage. In other embodiments, the data manager may include the authentication information in the discovery request obtained above. The cloud resources may be accessed using the authentication information via other and/or additional methods without departing from embodiments disclosed herein.

In Step 214, subscriptions associated with the cloud resources are identified. In one or more embodiments, the CSP proxy may query and/or otherwise obtain subscription identifiers associated with the subscriptions of the on-premises CSP directly and/or indirectly through another entity of the on-premises CSP (e.g., a discovery application) using API calls. The subscription identifiers may specify the subscriptions associated with the on-premises CSP. The subscriptions associated with the cloud resources of the on premises CSP may be identified via other and/or additional methods without departing from embodiments disclosed herein.

In Step 216, for each subscription, the account and the objects associated with the account stored in the limited access cloud data are identified. In one or more embodiments, the CSP proxy may query and/or otherwise obtain account information associated with the subscriptions of the on-premises CSP directly and/or indirectly through another entity of the on-premises CSP (e.g., a discovery application) using API calls and the subscription identifiers. The account information may be one or more data structures that include account identifiers specifying the accounts associated with each subscription and object identifiers and object types associated with each account. The object types may include, but not be limited to, virtual machines, blobs, storage accounts, containers, applications, folders, files, and metadata. Other types of objects (also referred to as logical objects) may be included in the limited access cloud data without departing from embodiments disclosed herein.

In Step 218, the objects are translated into assets to generate an asset hierarchy. In one or more embodiments, the CSP proxy generates an asset hierarchy using the identified subscriptions and the corresponding account information. The CSP proxy may place the object identifiers in the proper position of the asset hierarchy. In one or more embodiments, the asset hierarchy may be one or more data structures that specify assets (e.g., objects) and hierarchical relationships between the assets. The asset hierarchy may include multiple levels of dependency relationships between the assets. Each level associated of the asset hierarchy associated with a subscription may be considered by the data manager as an object agnostic asset container. The asset hierarchy may provide a hierarchical view of the objects included in the limited access cloud data of the on-premises CSP with multiple levels of granularity. The asset hierarchy may include other and/or additional information without departing from embodiments disclosed herein.

Consider an example asset hierarchy that includes seven hierarchical levels. The first level of assets may include the subscription identifiers. The second level of assets may include account identifiers, with each account identifier associated with a corresponding subscription. The third level of assets may include VM identifiers, with each VM identifier associated with a corresponding account identifier. The fourth level of assets may include container identifier, with each container associated with a VM identifier. The fifth level of assets may include blob identifiers, with each blob identifier associated with a corresponding container identifier. The sixth level of assets may include file identifiers, with each file identifier associated with a corresponding blob. The seventh level of assets may include metadata identifiers, with each metadata identifier associated with a corresponding file identifier. The asset hierarchy may include other, fewer, and/or additional levels without departing from embodiments disclosed herein. The asset hierarchy may include any level configuration without departing from embodiments disclosed herein.

In Step 220, the asset hierarchy is provided to the data manager. In one or more embodiments, the CSP proxy may provide the asset hierarchy to the data manager using any appropriate method of data transmission without departing from embodiments disclosed herein. For example, the CSP proxy may transmit the asset hierarchy as a message that includes one or more network packets through one or more network devices that operatively connect the CSP proxy to the data manager. The asset hierarchy may be provided to the data manager via other and/or additional methods without departing from embodiments disclosed herein.

In one or more embodiments disclosed herein, the method ends following Step 220.

Figure 3A:
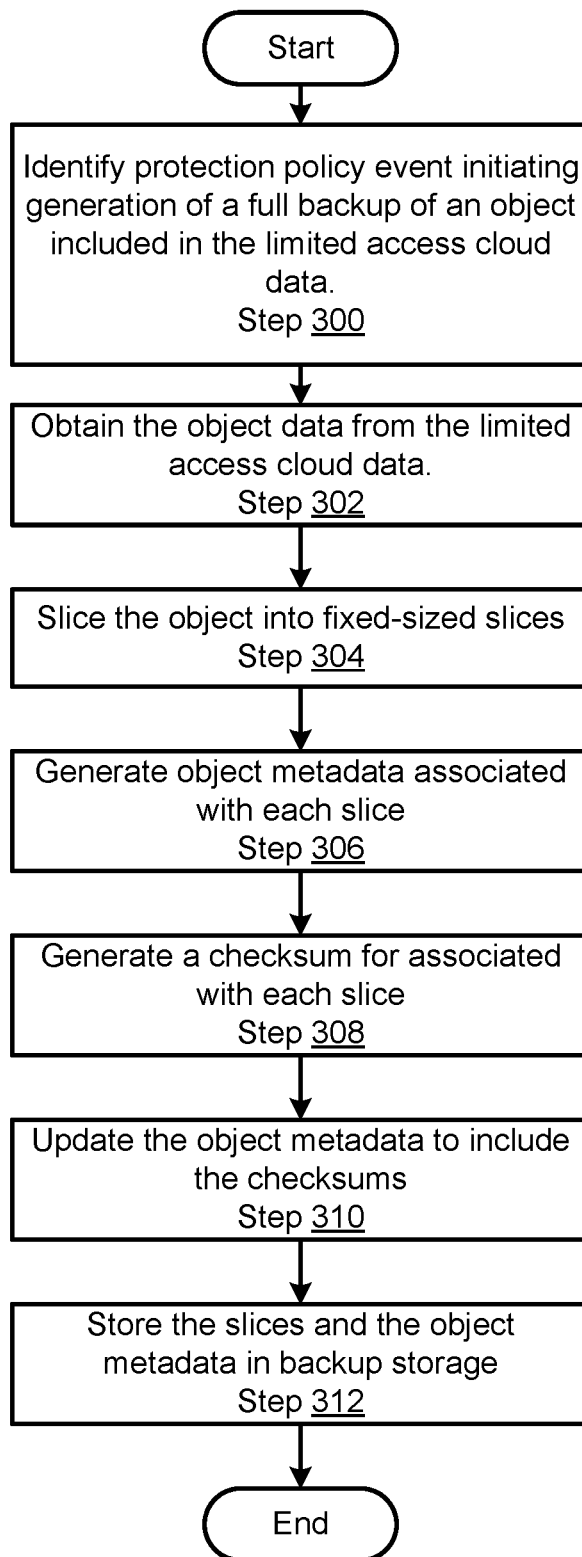
FIG. 3A shows a flowchart of a method for performing a full backup of an object included in the limited access cloud data in accordance with one or more embodiments disclosed herein.

FIG. 3A shows a flowchart of a method for performing a full backup of an object included in the limited access cloud data in accordance with one or more embodiments disclosed herein. The method shown in FIG. 3A may be performed by, for example, the CSP proxy (e.g., 122, FIG. 1A). Other components of the system in FIGS. 1A-1B may perform all, or a portion, of the method of FIG. 3A without departing from the scope of the embodiments described herein. While FIG. 3A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, a protection policy event initiating the generation of a full backup of an object included in the limited access cloud data is identified. In one or more embodiments, the data manager may maintain protection policies associated with objects stored in the limited access cloud data. The protection policies may specify a backup schedule for generating a full backup of the object. The backup schedule may specify points in time in which a full backup of the object is to be generated. For example, the backup schedule may specify that a full backup of the object is to be generated on the first day of the month. In one or more embodiments, when the data manager identifies a point in time specified by the protection policy associated with the object, the data manager sends a full backup request to the CSP proxy on the on-premises CSP. The CSP proxy may identify the receipt of the full backup request from the data manager as the protection policy event initiating the generation of a full backup of the object. The protection policy event initiating the generation of a full backup of an object included in the limited access cloud data may be identified via other and/or additional methods without departing from embodiments disclosed herein.

In Step 302, object data associated with the object is obtained from the limited access cloud data. In one or more embodiments, the request obtained from the data manager may include the object identifier associated with the object. The CSP proxy may use the object identifier to obtain object data associated with the object identifier from the limited access cloud data on cloud resources of the on-premises CSP. The CSP proxy may directly obtain the object data from one or more storages of the cloud resources. Alternatively, the CSP proxy may submit a request (e.g., an API call) for object data associated with the object identifier to one or more entities (e.g., applications) that maintain the limited access cloud data. The object data associated with the object may be obtained from the limited access cloud data via other and/or additional methods without departing from embodiments disclosed herein.

In Step 304, the object is sliced into fixed-sized slices. In one or more embodiments, the CSP proxy may slice (e.g., divide) the object data of the object into fixed-sized portions referred to as slices. The fixed-sized slices may include any quantity of data. The fixed-sized may be configured by a user of the data manager. The object may be sliced into fixed-sized slices via other and/or additional methods without departing from embodiments disclosed herein.

In Step 306, object metadata associated with each slice is generated. In one or more embodiments, the CSP proxy may generate the object metadata. The object metadata may refer to one or more data structures that include the object identifier, a timestamp associated with the backup of the object, and slice identifiers associated with the generated slices. The object metadata may include other and/or additional information associated with the object and the slices without departing from embodiments disclosed herein. The object metadata associated with each slice may be generated via other and/or additional methods without departing from embodiments disclosed herein.

In Step 308, a checksum associated with each slice is generated. In one or more embodiments, the CSP proxy may generate a checksum associated with each slice. In one or more embodiments, a checksum may refer to a small-sized block of data that represents a larger-sized slice. The CSP proxy may use any appropriate checksum generation algorithm (e.g., a hash function, a fingerprinting algorithm, a cryptographic hash function, etc.) to generate the checksums without departing from embodiments disclosed herein. The checksum associated with each slice may be generated via other and/or additional methods without departing from embodiments disclosed herein.

In Step 310, the object metadata is updated to include the checksums. In one or more embodiments, the CSP proxy may update the object metadata to include the generated checksums. The CSP proxy may associate the checksums with the slice identifiers corresponding to the slice used to generate the checksums. The slice identifiers and the associated checksum may be ordered sequentially in the object metadata. For example, the object metadata may include the slice identifier and the associated checksum corresponding to the first slice first, the slice identifier and the associated checksum corresponding to the second slice second, etc. The object metadata may be updated to include the checksums via other and/or additional methods without departing from embodiments disclosed herein.

In Step 312, the slices and the object metadata are stored in the backup storage. In one or more embodiments, the CSP manager may store the slices and the object metadata in the backup storage to generate the full backup of the object. The slices and the object metadata may be used in future backup operations to generate incremental approximation backups. The slices and the object metadata may be stored in the backup storage via other and/or additional methods without departing from embodiments disclosed herein.

In one or more embodiments disclosed herein, the method ends following Step 312.

Figure 3B:
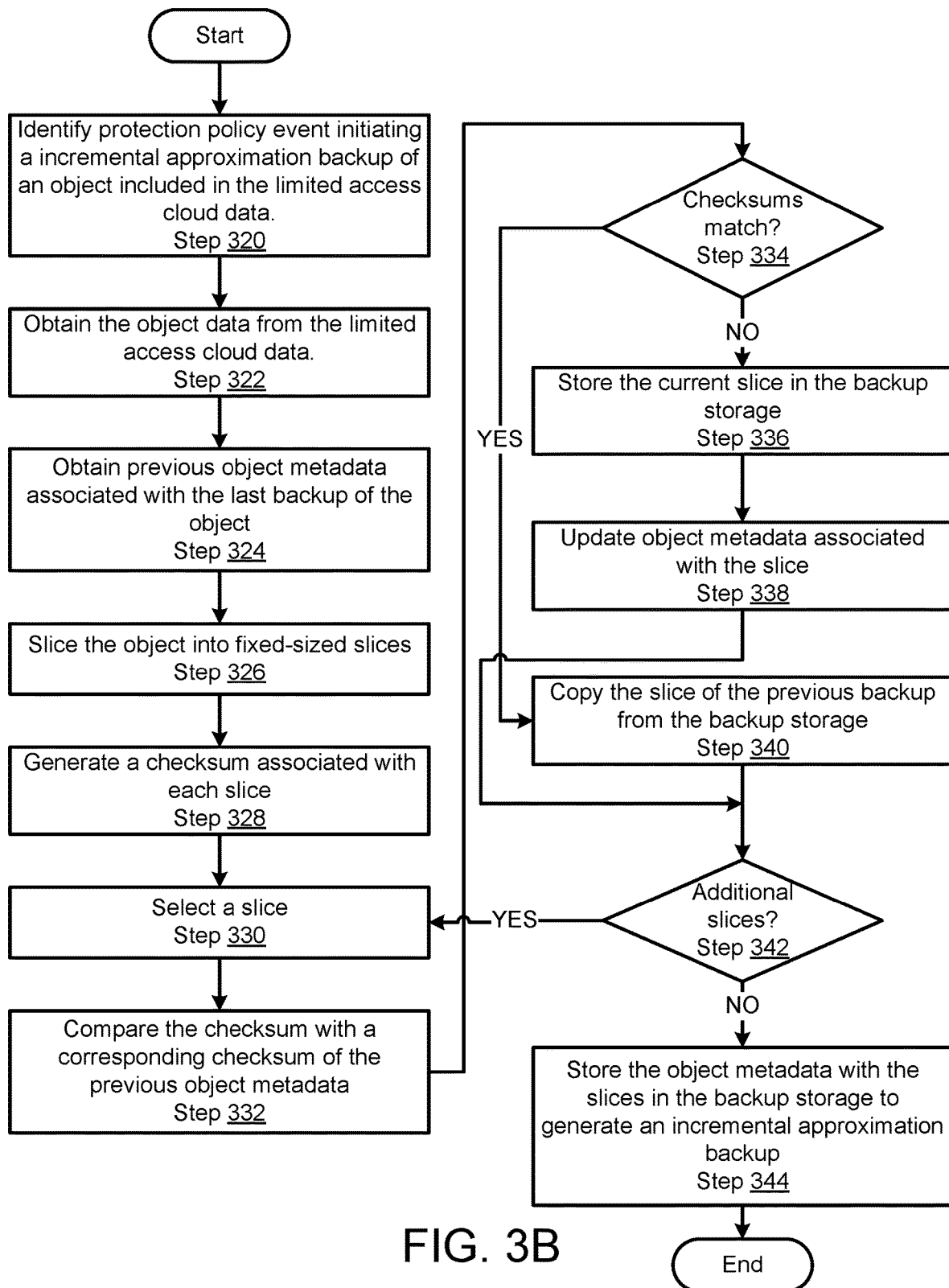
FIG. 3B shows a flowchart of a method for performing an incremental approximation backup of an object included in the limited access cloud data in accordance with one or more embodiments disclosed herein.

FIG. 3B shows a flowchart of a method for performing an incremental approximation backup of an object included in the limited access cloud data in accordance with one or more embodiments disclosed herein. The method shown in FIG. 3B may be performed by, for example, the CSP proxy (e.g., 122, FIG. 1A). Other components of the system in FIGS. 1A-1B may perform all, or a portion, of the method of FIG. 3B without departing from the scope of the embodiments described herein. While FIG. 3B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 320, a protection policy event initiating the generation of an incremental approximation backup of an object included in the limited access cloud data is identified. In one or more embodiments, the data manager may maintain protection policies associated with objects stored in the limited access cloud data. The protection policies may specify a backup schedule for generating an incremental approximation backup of the object. The backup schedule may specify points in time at which an incremental approximation backup of the object is to be generated. For example, the backup schedule may specify that an incremental approximation backup of the object is to be generated on every Sunday. In one or more embodiments, when the data manager identifies a point in time specified by the protection policy associated with the object, the data manager sends an incremental approximation backup request to the CSP proxy on the on-premises CSP. The CSP proxy may identify the receipt of the incremental approximation backup request from the data manager as the protection policy event initiating the generation of an incremental approximation backup of the object. The protection policy event initiating the generation of an incremental approximation backup of an object included in the limited access cloud data may be identified via other and/or additional methods without departing from embodiments disclosed herein.

In Step 322, object data is obtained from the limited access cloud data. In one or more embodiments, the request obtained from the data manager may include the object identifier associated with the object. The CSP proxy may use the object identifier to obtain object data associated with the object identifier from the limited access cloud data on cloud resources of the on-premises CSP. The CSP proxy may directly obtain the object data from one or more storages of the cloud resources. Alternatively, the CSP proxy may submit a request (e.g., an API call) for object data associated with the object identifier to one or more entities (e.g., applications) that maintain the limited access cloud data. The object data associated with the object may be obtained from the limited access cloud data via other and/or additional methods without departing from embodiments disclosed herein.

In Step 324, previous object metadata associated with the last backup of the object is obtained. In one or more embodiments, the CSP proxy may obtain the previous object metadata associated with the previous backup of the object using the object identifier. The CSP proxy may send a request to the backup storage for the previous object metadata associated with the object. The request may include the object identifier. In response to obtaining the request, the backup storage may obtain the object metadata that includes the object identifier and the most recent timestamp and provide the previous object metadata to the CSP proxy. The previous object metadata associated with the last backup of the object may be obtained via other and/or additional methods without departing from embodiments disclosed herein.

In Step 326, the object is sliced into fixed-sized slices. In one or more embodiments, the CSP proxy may slice (e.g., divide) the object data of the object into fixed-sized portions referred to as slices. The fixed-sized slices may include any quantity of data. The fixed-sized may be configured by a user of the data manager. The generated slices may correspond to previously generated slices used in the previous backup of the object. The object may be sliced into fixed-sized slices via other and/or additional methods without departing from embodiments disclosed herein.

In Step 328, a checksum associated with each slice is generated. In one or more embodiments, the CSP proxy may generate a checksum associated with each slice. In one or more embodiments, a checksum may refer to a small-sized block of data that represents a larger-sized slice. The CSP proxy may use any appropriate checksum generation algorithm (e.g., a hash function, a fingerprinting algorithm, a cryptographic hash function, etc.) to generate the checksums without departing from embodiments disclosed herein. The checksum associated with each slice may be generated via other and/or additional methods without departing from embodiments disclosed herein.

In Step 330, a slice is selected. In one or more embodiments, the CSP proxy may select slices in order. In other words, the CSP proxy may select the first slice, then the second slice, then the third slice, etc. After selecting a slice, the CSP proxy may tag the slice to ensure that no slice is selected twice. The slice may be selected via other and/or additional methods without departing from embodiments disclosed herein.

In Step 332, the generated checksum is compared to a corresponding checksum included in the previous object metadata. In one or more embodiments, the CSP proxy selects the currently generated checksum corresponding to the selected slice and the corresponding previous checksum from the previous object metadata. The CSP proxy may then compare the current checksum with the previous checksum corresponding to the same fix-sized slice. The generated checksum may be compared to a corresponding checksum included in the previous object metadata via other and/or additional methods without departing from embodiments disclosed herein.

In Step 334, a determination is made as to whether the checksums match. As discussed above, the CSP proxy compares the current and previous checksums associated with the selected slice. In one or more embodiments disclosed herein, if the checksums match, then the data in the slice did not change since the previous backup of the object was generated. In one or more embodiments disclosed herein, if the checksums do not match, then at least a portion of the data in the slice was updated, deleted, modified, or otherwise changed since the previous backup of the object was generated. In one or more embodiments disclosed herein, if the data included in the current checksum is different from the data included in the previous checksum, then the CSP proxy determines that the checksums do not match. In one or more embodiments disclosed herein, if the data included in the current checksum is the same as the data included in the previous checksum, then the CSP proxy determines that the checksums match. The determination as to whether the checksums match may be made via other and/or additional methods without departing from embodiments disclosed herein.

In one or more embodiments disclosed herein, if it is determined that the checksums match, then the method proceeds to Step 340. In one or more embodiments disclosed herein, if it is determined that the checksums do not match, then the method proceeds to Step 336.

In Step 336, the current slice is stored in the backup storage as part of the incremental approximation backup. In one or more embodiments, the CSP manager includes the selected slice in the slices that are sent to the backup storage to generate the incremental approximation backup. Only slices that have changed since the previous backup of the object was generated are sent to the backup storage as part of the incremental approximation backup. The current slice may be stored in the backup storage as part of the incremental approximation backup via other and/or additional methods without departing from embodiments disclosed herein.

In Step 338, the object metadata associated with the slice is updated. In one or more embodiments, the CSP proxy may update the previous object metadata to replace the previous checksum with the currently generated checksum associated with the slice. The object metadata associated with the slice may be updated via other and/or additional methods without departing from embodiments disclosed herein.

In one or more embodiments disclosed herein, the method proceeds to Step 342

In Step 340, the slice of the previous backup is copied from the backup storage. In one or more embodiments, the CSP proxy may discard the currently generated slice. The CSP proxy may include the slice identifier in a list of unchanged slices. When storing the changed slices in the backup storage, the CSP proxy may request the backup storage to copy the slices associated with the slice identifiers included in the list of unchanged slices from the previous backup of the object to the current incremental approximation backup to generate synthetic full backup. The slice of the previous backup may be copied from the backup storage via other and/or additional methods without departing from embodiments disclosed herein.

In Step 342, a determination is made as to whether there are additional slices. As discussed above, the CSP proxy may tag slices after they are selected. In one or more embodiments, the CSP manager may check the slices for untagged slices. In one or more embodiments disclosed herein, if the CSP proxy identifies an untagged slice, then the CSP proxy determines that there are additional slices. In one or more embodiments disclosed herein, if the CSP proxy identifies an untagged slice, then the CSP proxy determines that there are additional slices. The determination as to whether there are additional slices may be made via other and/or additional methods without departing from embodiments disclosed herein.

In one or more embodiments disclosed herein, if it is determined that there are additional slices, then the method proceeds to Step 330. In one or more embodiments disclosed herein, if it is determined that there are no additional slices, then the method proceeds to Step 344.

In Step 344, the object metadata and the slices are stored in the backup storage to generate an incremental approximation backup. In one or more embodiments, the CSP proxy may update the timestamp included in the previous object metadata to generate current object metadata. The object metadata may also include the current checksums associated with changed slices as discussed above. The CSP manager may send the changed slices and the current object metadata to the backup storage to generate the incremental approximation backup. Also as discussed above, when storing the changed slices in the backup storage, the CSP proxy may request the backup storage to copy the slices associated with the slice identifiers included in the list of unchanged slices from the previous backup of the object to the current incremental approximation backup to generate synthetic full backup. The object metadata and the slices may be stored in the backup storage to generate the incremental approximation backup via other and/or additional methods without departing from the embodiments disclosed herein.

In one or more embodiments disclosed herein, the method ends following Step 344.

Figure 4:
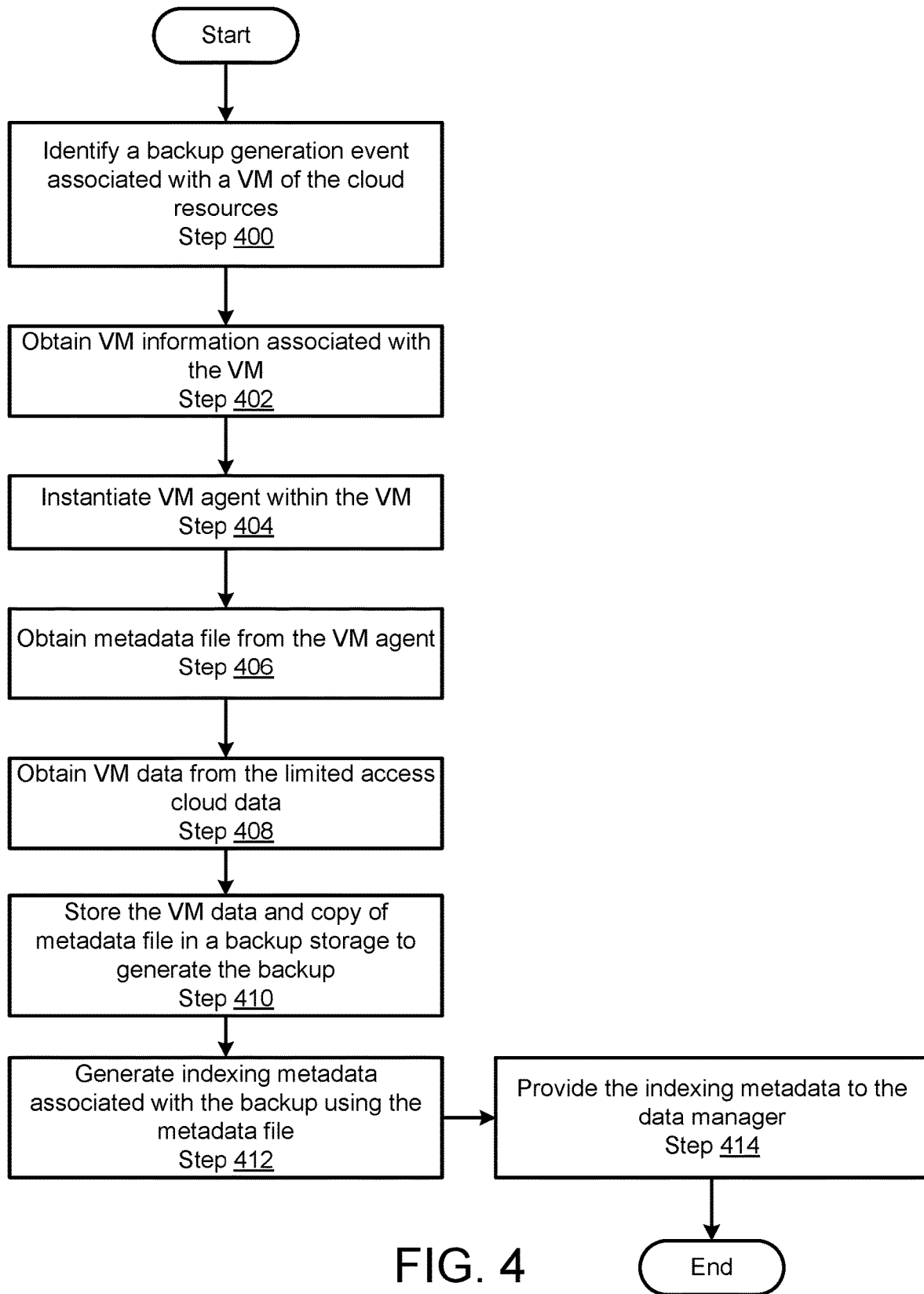
FIG. 4 shows a flowchart of a method for generating indexing metadata in accordance with one or more embodiments disclosed herein.

FIG. 4 shows a flowchart of a method for generating indexing metadata in accordance with one or more embodiments disclosed herein. The method shown in FIG. 4 may be performed by, for example, the CSP proxy (e.g., 122, FIG. 1A). Other components of the system in FIGS. 1A-1B may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 400, a backup generation event associated with a virtual machine (VM) of the cloud resources is identified. In one or more embodiments, the data manager may maintain protection policies associated with VMs stored in the limited access cloud data. The protection policies may specify a backup schedule for generating a backup of the VM. The backup schedule may specify points in time at which a backup of the VM is to be generated. For example, the backup schedule may specify that a backup of the VM is to be generated every Sunday. In one or more embodiments, when the data manager identifies a point in time specified by the protection policy associated with the VM, the data manager sends a backup request to the CSP proxy on the on-premises CSP. The CSP proxy may identify the receipt of the backup request from the data manager as the backup generation event initiating the generation of a backup of the VM. The backup generation event associated with the VM of the cloud resources may be identified via other and/or additional methods without departing from embodiments disclosed herein.

In Step 402, VM information associated with the VM is obtained. In one or more embodiments, the request obtained from the data manager may include the VM identifier associated with the VM. The CSP proxy may use the VM identifier to obtain VM information associated with the VM corresponding to the VM identifier from the limited access cloud data on cloud resources of the on-premises CSP. The CSP proxy may directly obtain the VM information from one or more storages of the cloud resources. Alternatively, the CSP proxy may submit a request (e.g., an API call) for VM information associated with the VM identifier to one or more entities (e.g., VMs, applications, etc.) that maintain the limited access cloud data. The VM information associated with the VM may be obtained from the limited access cloud data via other and/or additional methods without departing from embodiments disclosed herein.

In one or more embodiments, the VM information may be one or more data structures that include information associated with the VM. The VM information may include the VM identifier, the VM version, and the VM operating system associated with the VM. The VM information may include other and/or additional information associated with the VM without departing from embodiments disclosed herein.

In Step 404, a VM agent is instantiated within the VM. In one or more embodiments disclosed herein, the CSP proxy may instantiate the VM agent within the VM. The CSP proxy may instantiate the VM agent by providing computer instructions (e.g., a VM agent binary, a VM agent image, etc.) to the VM or cloud resource(s) which host the VM and initiate the execution of the computer instruction so that the VM agent is instantiated. The VM agent may be instantiated within the VM via other and/or additional methods without departing from embodiments disclosed herein.

In Step 406, a metadata file is obtained from the VM agent. In one or more embodiments, the VM agent may parse the operating system of the VM to identify VM objects (e.g., folders, files, and/or applications) associated with the VM. The VM agent may also parse the VM metadata included in the VM for storage locations associated with the VM objects. After identifying the VM objects and their corresponding storage locations, the VM agent may generate a metadata file. The metadata file may be a data structure that specifies the VM objects and the storage locations associated with the VM objects. The VM agent may then provide the metadata file to the CSP proxy. The metadata file may be obtained from the VM agent via other and/or additional methods without departing from embodiments disclosed herein.

In Step 408, VM data is obtained from the limited access cloud data. The CSP proxy may use the VM identifier and/or the VM metadata file to obtain VM data associated with the VM corresponding to the VM identifier from the limited access cloud data on cloud resources of the on-premises CSP. The CSP proxy may directly obtain the VM data from the limited access cloud data. Alternatively, the CSP proxy may submit a request (e.g., an API call) for VM data associated with the VM identifier to one or more entities (e.g., VMs, applications, etc.) that maintain the limited access cloud data. The VM data associated with the VM may be obtained from the limited access cloud data via other and/or additional methods without departing from embodiments disclosed herein.

In Step 410, the VM data and a copy of the metadata file are stored in the backup storage to generate the backup. In one or more embodiments, the CSP manager may store the VM data and a copy of the metadata file in the backup storage to generate the backup of the VM. The VM metadata file may be used in future VM object restoration operations to identify VM objects and the storage location (e.g., storage addresses, data offsets, storage identifiers, etc.) in the backup storage of the VM objects. The VM data and the copy of the metadata file may be stored in the backup storage to generate the backup via other and/or additional methods without departing from embodiments disclosed herein.

In Step 412, indexing metadata associated with the backup is generated using the metadata file. In one or more embodiments, the CSP proxy may generate the indexing metadata using the metadata file. The indexing metadata may be one or more data structures that specify the VM objects of the VM and storage locations of the VM objects in the backup storage. The indexing metadata may also include all, or a portion of, the VM information associated with the VM. The indexing metadata may include other and/or additional information without departing from embodiments disclosed herein. The indexing metadata associated with the backup may be generated using the metadata file via other and/or additional methods without departing from embodiments disclosed herein.

In Step 414, the indexing metadata is provided to the data manager. In one or more embodiments, the CSP proxy may provide the indexing metadata to the data manager using any appropriate method of data transmission without departing from embodiments disclosed herein. For example, the CSP proxy may transmit the indexing metadata as a message that includes one or more network packets through one or more network devices that operatively connect the CSP proxy to the data manager. The indexing metadata may be provided to the data manager via other and/or additional methods without departing from embodiments disclosed herein.

In one or more embodiments, the data manager may use the indexing metadata to perform VM object level restorations of VMs included in the limited access cloud data.

In one or more embodiments disclosed herein, the method ends following Step 414.

Figure 5:
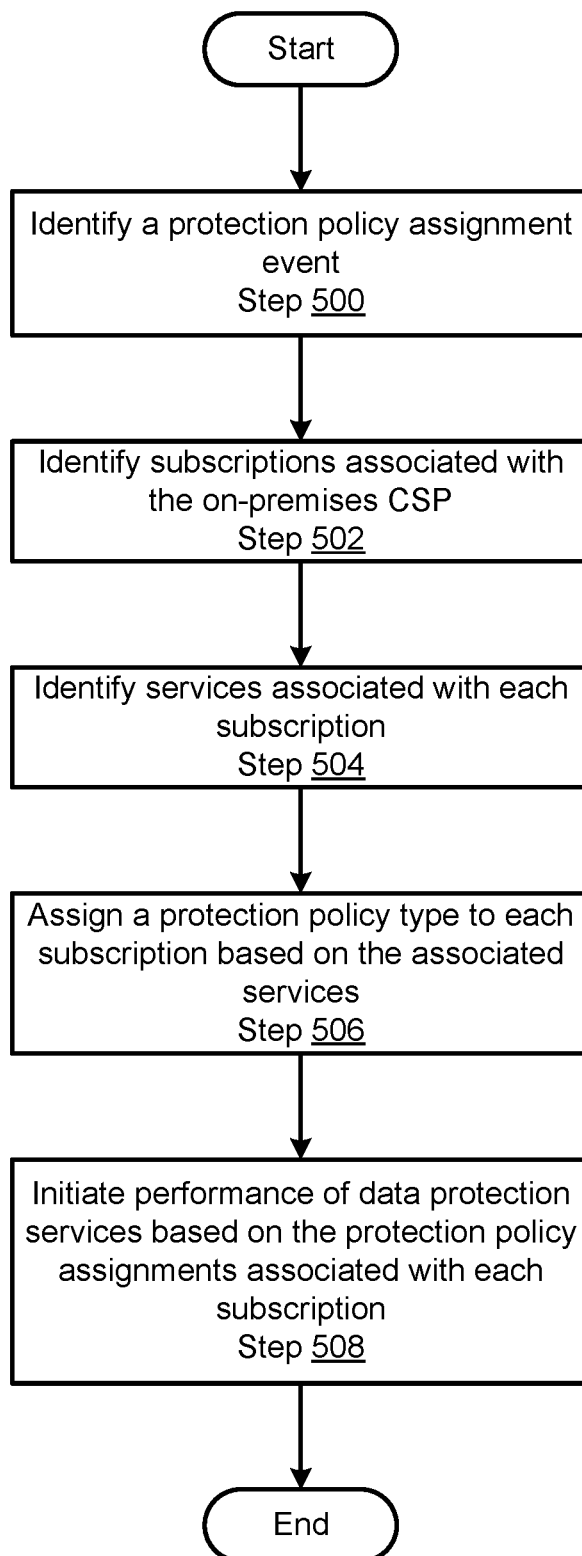
FIG. 5 shows a flowchart of a method for assigning protection policy types to subscriptions in accordance with one or more embodiments disclosed herein.

FIG. 5 shows a flowchart of a method for assigning protection policy types to subscriptions in accordance with one or more embodiments disclosed herein. The method shown in FIG. 5 may be performed by, for example, the data manager (e.g., 100, FIG. 1A). Other components of the system in FIGS. 1A-1B may perform all, or a portion of, the method of FIG. 5 without departing from the scope of the embodiments described herein. While FIG. 5 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 500, a new protection policy assignment event is identified. In one or more embodiments, the data manager may periodically update the protection policy assignments according to a protection policy assignment schedule. The data manager may identify the occurrence of a point time specified by the protection policy assignment schedule as the new protection policy assignment event. In other embodiments, a user may submit a request for a new protection policy assignment. The data protection manager may identify the receipt of this request as the new protection policy assignment event. The new protection policy assignment event may be identified via other and/or additional methods without departing from embodiments disclosed herein.

In Step 502, subscriptions associated with on-premises CSP are identified. In one or more embodiments, the data manager may send a subscription discovery request to the CSP proxy of the on-premises CSP. In response to obtaining the request, the CSP proxy may query and/or otherwise obtain subscription information associated with the subscriptions of the on-premises CSP directly or through another entity of the on-premises CSP. After identifying the subscriptions, the CSP proxy may provide the subscription information to the data manager. The subscription information may specify the subscriptions associated with the on-premises CSP. The subscriptions associated with the on-premises CSP may be identified via other and/or additional methods without departing from embodiments disclosed herein.

In Step 504, services associated with each subscription are identified. In one or more embodiments, the data manager may identify the services associated with each subscription using the subscription information. The subscription information may refer to one or more data structures that include information associated with the subscriptions of the on-premises CSP. The subscription information may include subscription identifiers associated with each subscription. The subscription information may also include service identifier associated with the services of each subscription and may specify the cloud resources that perform the services. The subscription information may include other and/or additional information associated with the subscriptions without departing from embodiments disclosed herein. Services associated with each subscription may be identified via other and/or additional methods without departing from embodiments disclosed herein.

In Step 506, a protection policy type is assigned to each subscription based on the associated services. In one or more embodiments, the data manager may use service data protection information to assign protection policy types to each subscription. The service data protection information may specify data protection requirements associated with each service type. The service data protection information may also include the protection policy types that may be mapped to the subscriptions based on the types of services.

The data manager may compare the data protection requirements of the services of each subscription specified by the service data protection information with the data protection requirements specified by each protection policy type. The data manager may assign the protection policy type of the protection policy types that meets the data protection requirements associated with services of each subscription by associating the subscription identifier with the protection policy type. The data manager may store and/or update the protection policy type assignments associated with the subscription in the user information repository. A protection policy type may be assigned to each subscription based on the associated services via other and/or additional methods without departing from embodiments disclosed herein.

In Step 508, the performance of data protection services based on the protection policy assignments associated with each subscription is initiated. In one or more embodiments of the invention, the data manager initiates the performance of data protection services for the subscriptions using the assigned protection policy types. As discussed above, the protection policy types may include protection policies that specify data protection requirements associated with the services of the subscription. The data manager may initiate the performance of data protection services for each service that satisfy the data protection requirements of each service specified by each assigned protection policy type.

The data protection services may include generating backups of limited access cloud data objects associated with the services according to a schedule specified by the assigned protection policy types, storing backups in storage locations specified by the mapped protection policy types, and other and/or additional data protection services that satisfy data protection requirements specified by the assigned protection policy types without departing from embodiments disclosed herein. The data manager may initiate the performance of the data protection services by monitoring the protection policy types assigned to each subscription sending request to perform the data protection services specified by the assigned protection policy types to the CSP proxy. As a result, the CSP proxy may perform the data protection services. The performance of data protection services based on protection policy assignments associated with each subscription may be initiated via other and/or additional methods without departing from embodiments disclosed herein.

In one or more embodiments disclosed herein, the method ends following Step 508.

Figure 6:
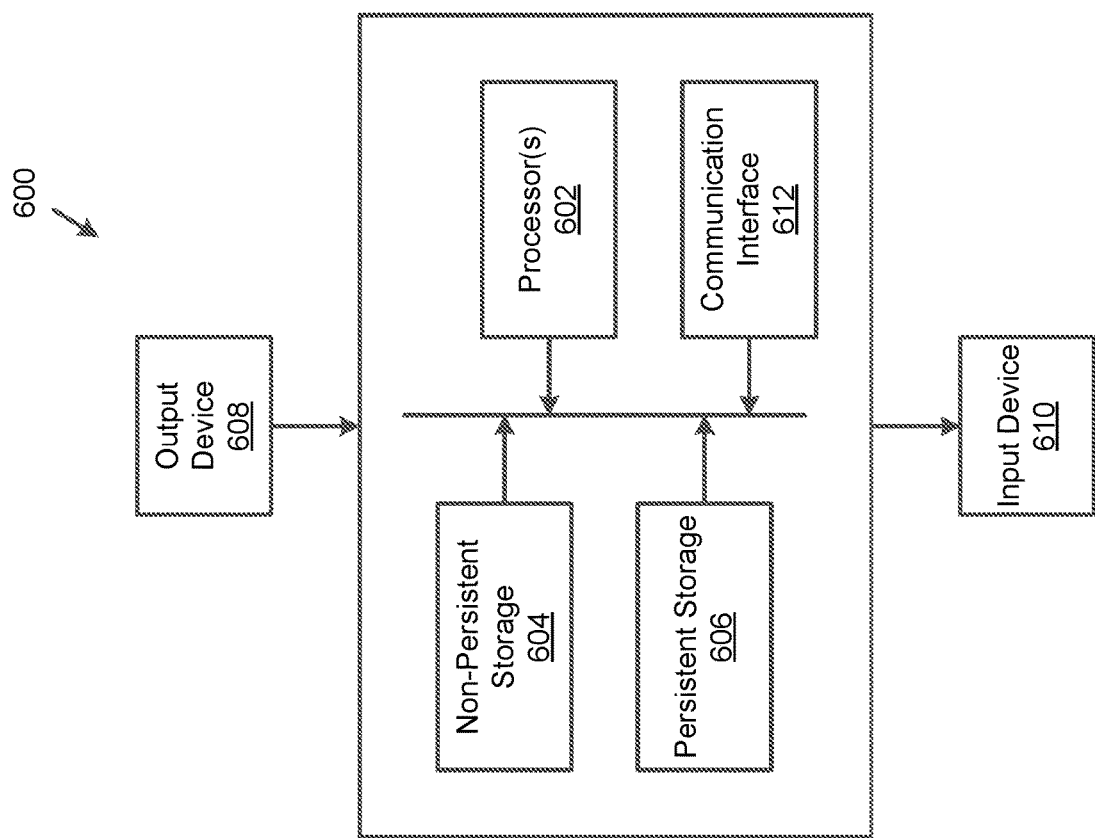
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing data protection services for limited access cloud data, comprising:
   obtaining, by a data manager, an initial cloud service provider (CSP) proxy generation request from a user, wherein the initial CSP proxy request includes a user identifier and a request to instantiate a CSP proxy in an on-premises CSP to access the limited cloud access data and wherein the user submits the request using a graphical user interface connected to the data manager and wherein the data manager is connected to the on-premises CSP;
   in response to obtaining the initial (CSP) proxy generation request:
      creating an authentication account in a CSP directory based on the initial CSP proxy generation request, wherein the authentication account comprises authentication information that allows access to cloud resources and the limited cloud access data;
      instantiating the CSP proxy in the on-premises CSP using the authentication information associated with the authentication account, wherein the CSP proxy controls access to the limited access cloud data;
      storing the authentication information in a user information repository of the data manager; and
      associating the user with the authentication information and the CSP proxy, wherein the authentication information is used by the CSP proxy to access the cloud resources and the limited access cloud data in the on-premises CSP.

2. The method of claim 1, wherein data protection manager provides data protection management services for the CSP proxy and the on-premises CSP.

3. The method of claim 1, wherein the CSP proxy provides data protection services for the limited access cloud data stored in the cloud resources of the on-premises CSP.

4. The method of claim 3, wherein the authentication information enables the CSP proxy to access the limited access cloud data.

5. The method of claim 4, further comprising:
   after associating the user with the authentication information and the CSP proxy:
      identifying, by the CSP proxy, a discovery event for objects stored in the limited access cloud data;
      connecting to the cloud resources using the authentication information;
      identifying subscription associated with the cloud resources;
      for each subscription:
         identifying the account and the objects associated with the account stored in the limited access cloud data;
         translating the objects into assets to generate an asset hierarchy; and
         providing the asset hierarchy to the data manager.

6. The method of claim 5, wherein the asset hierarchy specifies a hierarchical relationship between the assets of the subscriptions.

7. The method of claim 5, wherein the objects comprise:
   virtual machines;
   blobs; and
   containers.

8. A non-transitory computer readable medium comprising computer readable program code, which when executed by a computer processor enables the computer processor to perform a method for performing data protection of limited access cloud data, the method comprising:
   obtaining, by a data manager, an initial cloud service provider (CSP) proxy generation request from a user, wherein the initial CSP proxy request includes a user identifier and a request to instantiate a CSP proxy in an on-premises CSP to access the limited cloud access data and wherein the user submits the request using a graphical user interface connected to the data manager and wherein the data manager is connected to the on-premises CSP;
   in response to obtaining the initial (CSP) proxy generation request:
      creating an authentication account in a CSP directory based on the initial CSP proxy generation request, wherein the authentication account comprises authentication information that allows access to cloud resources and the limited cloud access data;
      instantiating the CSP proxy in the on-premises CSP using the authentication information associated with the authentication account, wherein the CSP proxy controls access to the limited access cloud data;
      storing the authentication information in a user information repository of the data manager, and
      associating the user with the authentication information and the CSP proxy, wherein the authentication information is used by the CSP proxy to access the cloud resources and the limited access cloud data in the on-premises CSP.

9. The non-transitory computer readable medium of claim 8, wherein data protection manager provides data protection management services for the CSP proxy and the on-premises CSP.

10. The non-transitory computer readable medium of claim 8, wherein the CSP proxy provides data protection services for the limited access cloud data stored in the cloud resources of the on-premises CSP.

11. The non-transitory computer readable medium of claim 10, wherein the authentication information enables the CSP proxy to access the limited access cloud data.

12. The non-transitory computer readable medium of claim 11, wherein the method further comprising:
   after associating the user with the authentication information and the CSP proxy:
      identifying, by the CSP proxy, a discovery event for objects stored in the limited access cloud data;
      connecting to the cloud resources using the authentication information;
      identifying subscription associated with the cloud resources;
      for each subscription:
         identifying the account and the objects associated with the account stored in the limited access cloud data;
         translating the objects into assets to generate an asset hierarchy; and
         providing the asset hierarchy to the data manager.

13. The non-transitory computer readable medium of claim 12, wherein the asset hierarchy specifies a hierarchical relationship between the assets of the subscriptions.

14. The non-transitory computer readable medium of claim 12, wherein the objects comprise:
   virtual machines;
   blobs; and
   containers.

15. A system for performing data protection services for limited access cloud data, comprising:
   an on-premises cloud service provider (CSP); and
   a data manager, comprising a processor and memory, and programmed to:
      obtain an initial cloud service provider (CSP) proxy generation request from a user, wherein the initial CSP proxy request includes a user identifier and a request to instantiate a CSP proxy in an on-premises CSP to access the limited cloud access data and wherein the user submits the request using a graphical user interface connected to the data manager and wherein the data manager is connected to the on-premises CSP;
      in response to obtaining the initial (CSP) proxy generation request:
         create an authentication account in a CSP directory based on the initial CSP proxy generation request, wherein the authentication account comprises authentication information that allows access to cloud resources and the limited cloud access data;
         instantiate the CSP proxy in the on-premises CSP using the authentication information associated with the authentication account, wherein the CSP proxy controls access to the limited access cloud data;
      store the authentication information in a user information repository of the data manager; and
      associate the user with the authentication information and the CSP proxy, wherein the authentication information is used by the CSP proxy to access the cloud resources and the limited access cloud data in the on-premises CSP.

16. The system of claim 15, wherein data protection manager provides data protection management services for the CSP proxy and the on-premises CSP.

17. The system of claim 15, wherein the CSP proxy provides data protection services for the limited access cloud data stored in the cloud resources of the on-premises CSP.

18. The system of claim 17, wherein the authentication information enables the CSP proxy to access the limited access cloud data.

19. The system of claim 18, wherein the CSP proxy is programmed to:
   after associating the user with the authentication information and the CSP proxy:
      identifying, by the CSP proxy, a discovery event for objects stored in the limited access cloud data;
      connecting to the cloud resources using the authentication information;
      identifying subscription associated with the cloud resources;
      for each subscription:
         identifying the account and the objects associated with the account stored in the limited access cloud data;
         translating the objects into assets to generate an asset hierarchy; and
         providing the asset hierarchy to the data manager.

20. The system of claim 19, wherein the asset hierarchy specifies a hierarchical relationship between the assets of the subscriptions.

* * * * *